United States Patent
Takagi

(10) Patent No.: US 9,596,392 B2
(45) Date of Patent: Mar. 14, 2017

(54) DETACHABLE IMAGING UNIT AND IMAGING APPARATUS FOR A DISPLAY SCREEN

(71) Applicant: Sony Corporation, Tokyo (JP)

(72) Inventor: Noriaki Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 14/465,136

(22) Filed: Aug. 21, 2014

(65) Prior Publication Data

US 2015/0098017 A1    Apr. 9, 2015

(30) Foreign Application Priority Data

Oct. 3, 2013   (JP) ................................. 2013-208188

(51) Int. Cl.
*H04N 5/225*   (2006.01)
*G03B 17/14*   (2006.01)
*H04M 1/02*   (2006.01)

(52) U.S. Cl.
CPC ............ *H04N 5/2254* (2013.01); *G03B 17/14* (2013.01); *H04M 1/0264* (2013.01); *H04N 5/2252* (2013.01); *H04N 5/2253* (2013.01)

(58) Field of Classification Search
CPC ........ G03B 17/14; G03B 17/12; G03B 17/04; H04M 1/0264; H04M 1/0266; H04M 1/0254; H04N 5/2254
USPC ......................................... 348/360; 455/566
See application file for complete search history.

(56) References Cited

U.S. PATENT DOCUMENTS

| 7,102,686 B1* | 9/2006 | Orimoto | G03B 35/08 348/231.7 |
| 7,726,890 B2* | 6/2010 | Misawa | G03B 17/02 348/360 |
| 8,704,944 B1* | 4/2014 | Wierzoch | H04N 5/2251 348/207.99 |
| 2006/0233545 A1* | 10/2006 | Senba | G03B 17/14 396/529 |
| 2007/0058972 A1* | 3/2007 | Misawa | G03B 13/02 396/541 |

(Continued)

FOREIGN PATENT DOCUMENTS

| JP | 11-289482 | * 4/1998 | ............ H04N 5/225 |
| JP | 11-289482 | 10/1999 | |

*Primary Examiner* — Twyler Haskins
*Assistant Examiner* — Akshay Trehan
(74) *Attorney, Agent, or Firm* — Michael Best & Friedrich LLP

(57) ABSTRACT

An imaging unit includes an attached portion which is detachably attached to an attaching portion disposed in a display apparatus including a display screen, an imaging main body portion which includes an imaging element, and a rotational mechanism which includes a rotational member formed as an arc-like portion, and connects the attached portion and the imaging main body portion such that the imaging main body portion is able to be rotated around a center of an arc of the arc-like portion as a rotational center in a direction in which an imaging direction is changed, in which when viewed from a direction in which a rotational axis of the imaging main body portion by the rotational mechanism is viewed as a point, the imaging main body portion is superposed on a circle which has the same center and the same radius as the arc of the arc-like portion.

10 Claims, 22 Drawing Sheets

(56) References Cited

U.S. PATENT DOCUMENTS

2007/0147815 A1* 6/2007 Tanaka .................. G03B 17/14
396/56
2012/0262540 A1* 10/2012 Rondinelli ............. G03B 17/12
348/36

* cited by examiner

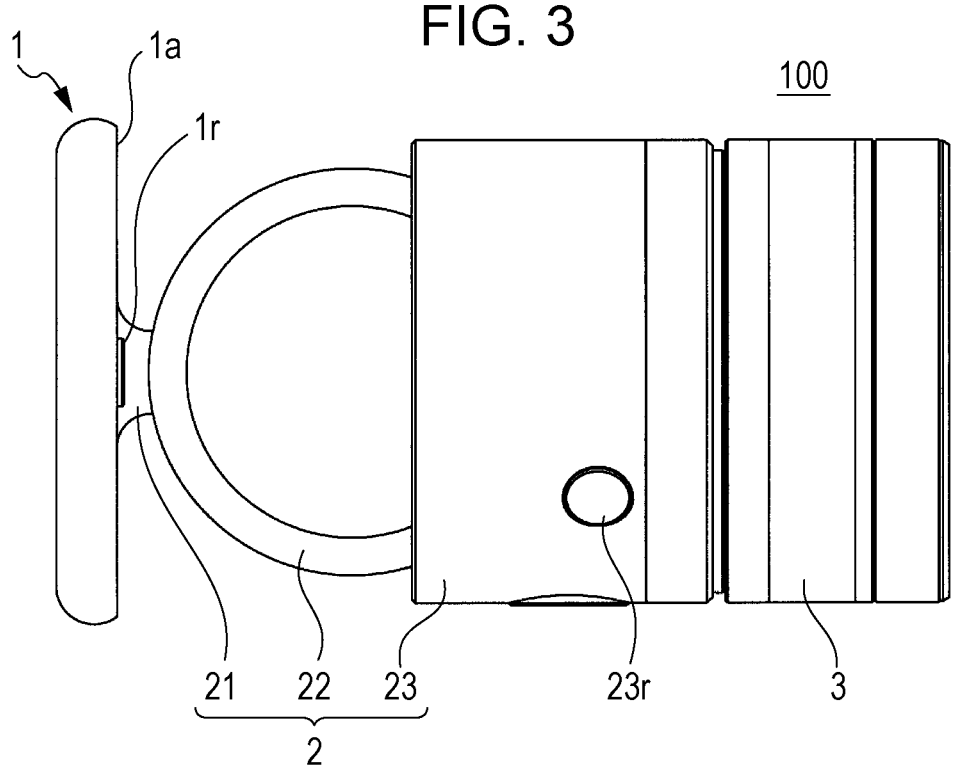
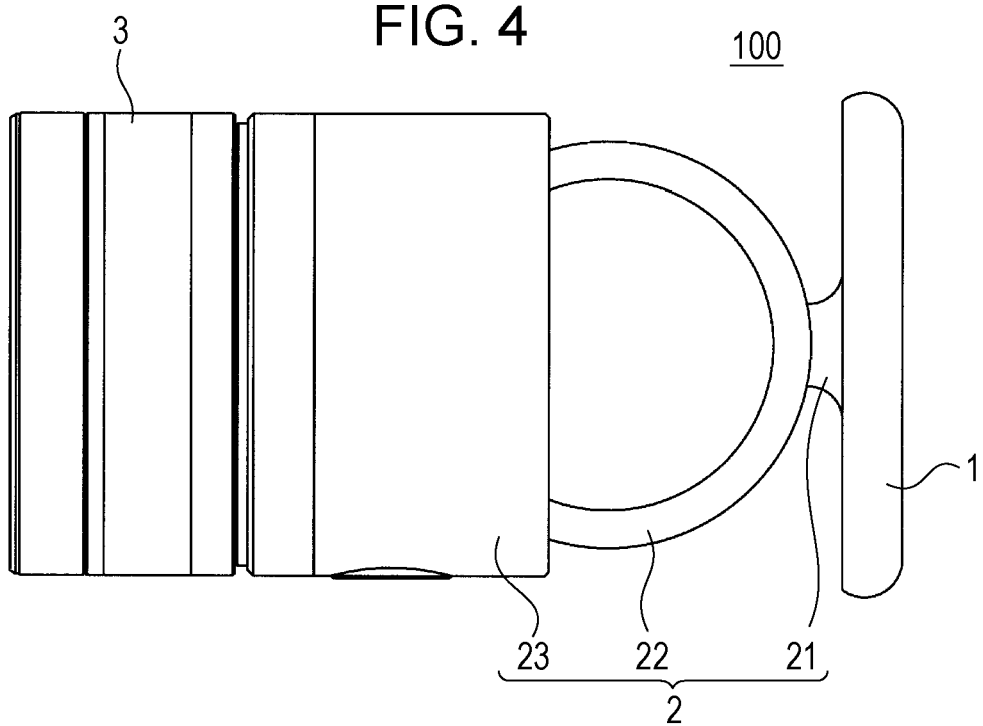

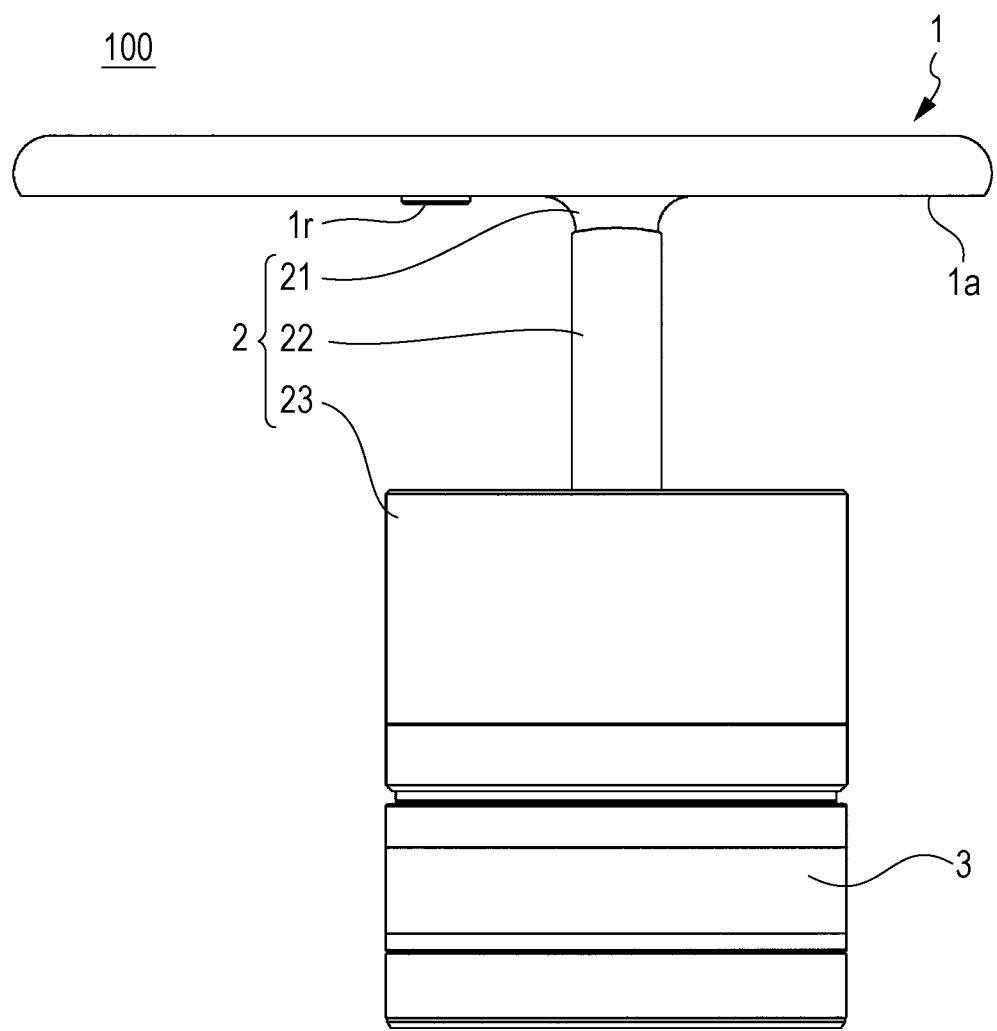

DETACHABLE IMAGING UNIT AND IMAGING APPARATUS FOR A DISPLAY SCREEN

CROSS REFERENCE TO RELATED APPLICATIONS

This application claims the benefit of Japanese Priority Patent Application JP 2013-208188 filed Oct. 3, 2013, the entire contents of which are incorporated herein by reference.

BACKGROUND

The present technology relates to an imaging unit which is detachably attached to a display apparatus including an imaging element, and to an imaging apparatus which is provided with a display main body portion including a display screen, and an imaging main body portion including an imaging element, and in particular, relates to a technical field of an imaging unit and an imaging apparatus in which an imaging main body portion including an imaging element is rotatable.

For example, as described in Japanese Unexamined Patent Application Publication No. 11-289482, as an imaging apparatus (an electronic camera) which is provided with an imaging main body portion (a lens unit) including an imaging element, and a display main body portion (a camera main body portion) including a display screen, an imaging apparatus in which a display main body portion rotatably retains an imaging main body portion is known.

Specifically, in the imaging apparatus described in Japanese Unexamined Patent Application Publication No. 11-289482, the display main body portion and the imaging main body portion are connected through a ball joint, and thus the imaging main body portion is able to be rotated.

SUMMARY

Here, when the ball joint is used, the imaging main body portion is not able to be directly bonded to a sphere (34B) included in the ball joint. That is, in the ball joint, at least a portion (a cap 36 or the like) for slidably covering the sphere is necessary, and thus the imaging main body portion is not able to be directly bonded to the sphere.

For this reason, when the ball joint is used, the imaging main body portion is positioned on an external side of the sphere.

However, according to this, an interval between the display main body portion and the imaging main body portion is formed in a state (an imaging state) where the imaging main body portion is rotated from a housed state to perform imaging, and thus it is not possible to make the imaging apparatus compact.

In addition, when the interval between the display main body portion and the imaging main body portion is formed as described above, stability on user's gripping the imaging apparatus is decreased.

Therefore, with respect to an imaging system or an imaging apparatus in which an imaging main body portion including an imaging element is able to be rotated, it is desired to make the imaging system or the imaging apparatus in an imaging state compact, and to improve stability on gripping the imaging system or the imaging apparatus.

According to an embodiment of the present technology, there is provided an imaging unit, including an attached portion which is detachably attached to an attaching portion disposed in a display apparatus including a display screen; an imaging main body portion which includes an imaging element; and a rotational mechanism which includes a rotational member formed as an arc-like portion in which at least a part of an outer circumference is bent into the shape of an arc, and connects the attached portion and the imaging main body portion such that the imaging main body portion is able to be rotated around a center of an arc of the arc-like portion as a rotational center in a direction in which an imaging direction of the imaging element is changed, in which when viewed from a direction in which a rotational axis of the imaging main body portion by the rotational mechanism is viewed as a point, the imaging main body portion is superposed on a circle which has the same center and the same radius as the arc of the arc-like portion.

Accordingly, the interval between the imaging main body portion and the display apparatus in the imaging state is narrowed.

Second, in the imaging unit according to the embodiment of the present technology described above, the attached portion may be configured to be attachable with respect to the attaching portion at different attachment angles.

Accordingly, the direction of the rotational axis of the imaging main body portion by the rotational mechanism is able to be changed.

Third, in the imaging unit according to the embodiment of the present technology described above, the rotational mechanism may include a member formed as an arc-like rail portion in which at least a part is bent into the shape of an arc as the rotational member, and may include sliding retaining units for slidably retaining the arc-like rail portion.

Accordingly, the imaging main body portion is able to be rotated around the center of the arc of the arc-like portion as the rotational center according to sliding of the arc-like rail portion in the sliding retaining units.

Fourth, in the imaging unit according to the embodiment of the present technology described above, the rotational member may be supported from the attached portion side, and the sliding retaining unit may be disposed in the imaging main body portion.

Accordingly, it is not necessary to dispose the sliding retaining unit on the attached portion side.

Fifth, in the imaging unit according to the embodiment of the present technology described above, a surface of the imaging main body portion on a side in which the imaging main body portion faces the rotational member may be bent into the shape of a mortar, and mirror-like finishing may be performed with respect to the bent portion.

Accordingly, when the imaging unit is observed from the back surface side, the rotational member (the arc-like rail portion) projects onto the back surface side of the imaging main body portion.

Sixth, in the imaging unit according to the embodiment of the present technology described above, the rotational member may be supported from the imaging main body portion side, and the sliding retaining unit may be disposed in the attached portion.

Accordingly, it is not necessary to secure a space in the inner portion of the imaging main body portion into which a part of the rotational member is inserted.

According to another embodiment of the present technology, there is provided an imaging apparatus including a display main body portion which includes a display screen; an imaging main body portion which includes an imaging element; and a rotational mechanism which includes a rotational member formed as an arc-like portion in which at least a part of an outer circumference is bent into the shape of an arc, and connects the display main body portion and the imaging main body portion such that the imaging main body portion is able to be rotated around a center of an arc of the arc-like portion as a rotational center in a direction in which an imaging direction of the imaging element is changed, in which the rotational center is on an external side of the display main body portion, and when viewed from a direction in which a rotational axis of the imaging main body portion by the rotational mechanism is viewed as a point, at least any one of the imaging main body portion and the display main body portion is superposed on a circle which has the same center and the same radius as the arc of the arc-like portion.

Accordingly, the interval between the imaging main body portion and the display main body portion in the imaging state is narrowed.

According to the present technology, with respect to the imaging system or the imaging apparatus in which the imaging main body portion including the imaging element is able to be rotated, it is possible to make the imaging system or the imaging apparatus in the imaging state compact, and to improve stability on gripping the imaging system or the imaging apparatus.

Furthermore, the effect is not limited to the effect described herein, but may be any effect described in the present disclosure.

BRIEF DESCRIPTION OF THE DRAWINGS

FIG. 3 is a left side view of the imaging system as the embodiment;
FIG. 4 is a right side view of the imaging system as the embodiment;
FIG. 5 is a plan view of the imaging system as the embodiment;
FIGS. 16A, 16B, and 16C are all left side views of the imaging unit.

DETAILED DESCRIPTION OF EMBODIMENTS

Figure 7:
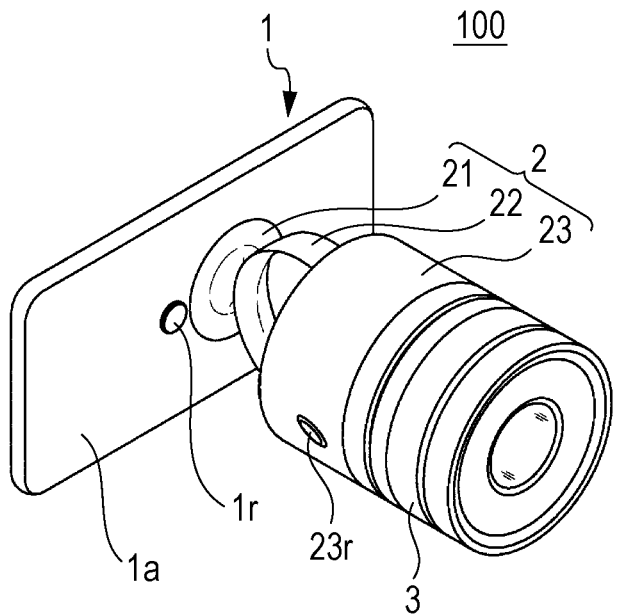
FIG. 7 is an external perspective view of the imaging system as the embodiment.
Figure 8:
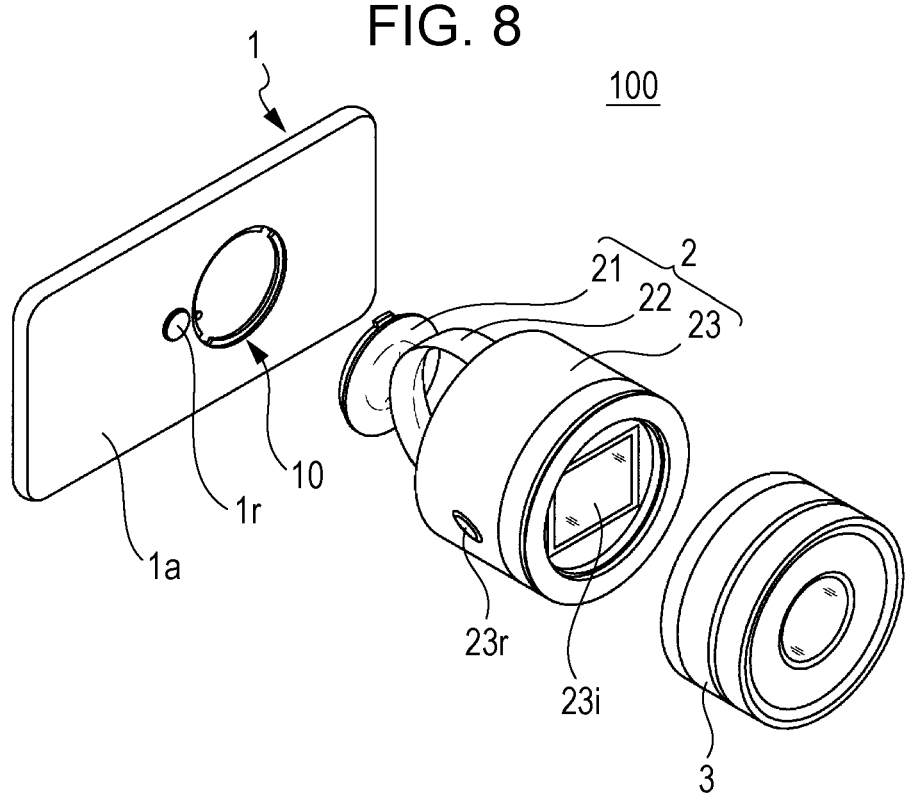
FIG. 8 is an exploded perspective view of the imaging system as the embodiment.

Hereinafter, embodiments will be described according to the following order with reference to the drawings.
1. Outline of Imaging System
2. Rotational Mechanism
3. Shape of Back Surface of Imaging Main Body Portion
4. Attaching Portion and Attached Portion
5. Conclusions and Effects
6. Modification Example
7. The Present Technology 1. Outline of Imaging System FIGS. 1 to 6 are six diagrams of an imaging system 100 including an imaging unit 2 as an embodiment, FIG. 7 is an external perspective view of the imaging system 100, FIG. 8 is an exploded perspective view of the imaging system 100, and FIGS. 9 to 14 are six diagrams of the imaging unit 2.

The imaging system 100 includes a display apparatus 1, an imaging unit 2, and an exchangeable lens 3 (refer to FIGS. 1 to 8).

The display apparatus 1 has a plate-like outer shape in which a front surface 1a and a back surface 1g are in the shape of an approximate rectangle, and a display screen G is formed on the back surface 1g.

A touch panel is formed on the display screen G, and a user is able to perform various manipulation inputs with respect to the display apparatus 1 through the touch panel. In addition, the user is able to perform a confirmation or the like with respect to a captured image by the display screen G.

An attaching portion 10 (refer to FIG. 8) and a release button 1r (refer to FIG. 3, and FIGS. 5 to 8) for detachably attaching the imaging unit 2 are formed in the front surface 1a of the display apparatus 1. The attaching portion 10 is formed such that a center thereof is in a position shifted to a right side from a center of the front surface 1a.

Furthermore, the attaching portion 10 and the release button 1r will be described later.

The imaging unit 2 includes an attached portion 21 detachably attached to the attaching portion 10 of the display apparatus 1, a rotational member 22, and an imaging main body portion 23 including an imaging element 23i (refer to FIGS. 3 to 14).

The imaging main body portion 23 has an approximately cylindrical outer shape, and includes a circuit unit (not illustrated) for creating captured image data on the basis of a captured image signal obtained according to a photoelectric conversion by the imaging element 23i in an inner portion.

Here, for example, the display apparatus 1 and the imaging main body portion 23 are able to perform a wireless communication according to a predetermined communication standard such as Wireless Fidelity (WiFi) or Bluetooth (registered trade mark) even though the illustration is omitted. Accordingly, the display apparatus 1 may receive a captured image created by the imaging unit 2 to display the image on the display screen G, or the display apparatus 1 may control an imaging operation by the imaging main body portion 23 according to the manipulation input by the user.

Furthermore, an authentication process with respect to the communication such as WiFi or Bluetooth may be performed by a Near Field Communication (NFC).

Figure 9:
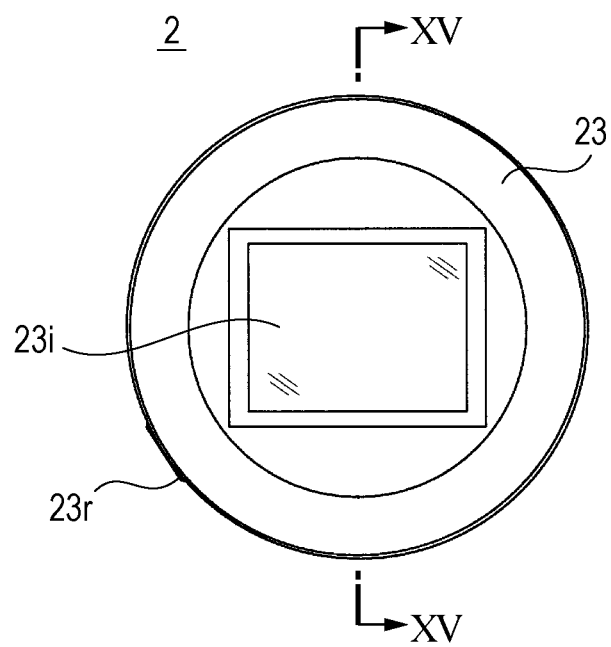
FIG. 9 is a front view of an imaging unit as the embodiment.
Figure 10:
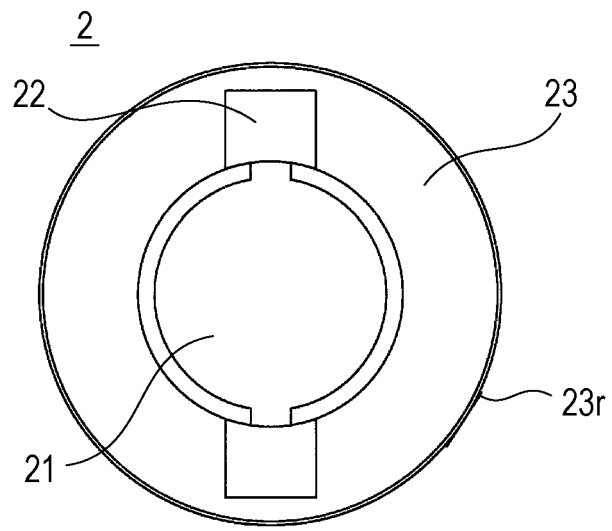
FIG. 10 is a rear view of the imaging unit as the embodiment.
Figure 11:
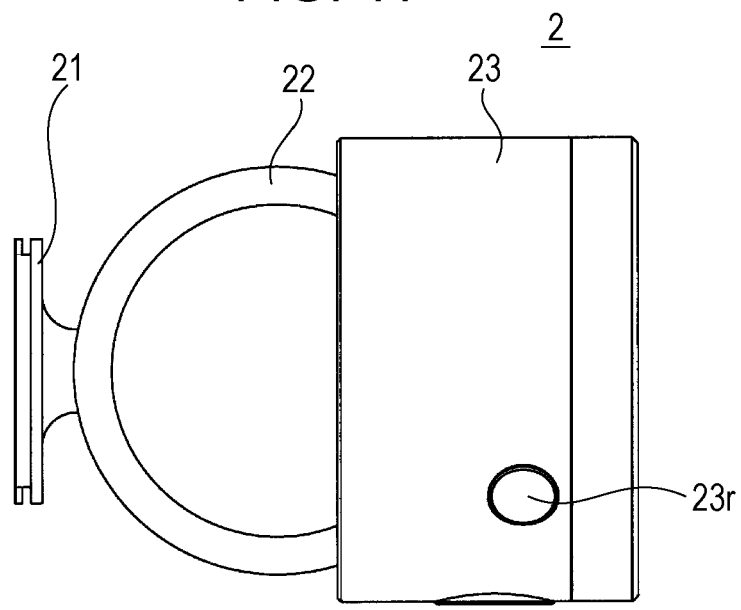
FIG. 11 is a left side view of the imaging unit as the embodiment.
Figure 12:
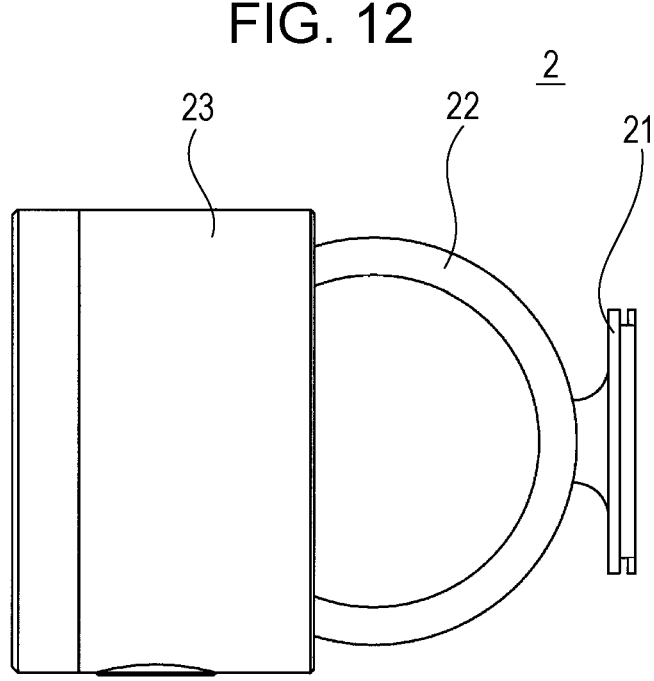
FIG. 12 is a right side view of the imaging unit as the embodiment.
Figure 13:
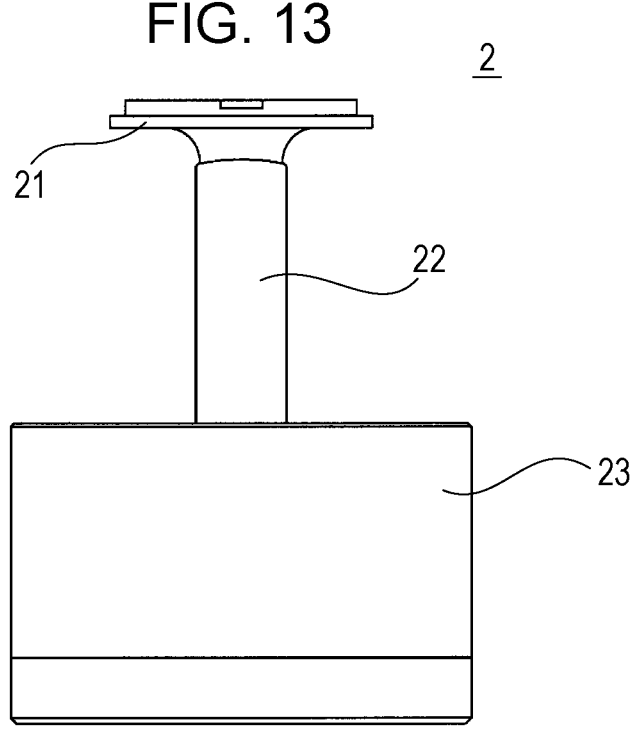
FIG. 13 is a plan view of the imaging unit as the embodiment.

The imaging main body portion 23 is opened on a front surface side, and the imaging element 23i is disposed in the opening (refer to FIGS. 8 and 9). Furthermore, in FIGS. 1 to 7, a state in which a rotation angle of the imaging main body portion 23 is adjusted to be in a state where an imaging surface of the imaging element 23i faces toward a front (that is, in a state where an imaging direction of the imaging element 23i is a front direction) is illustrated.

A lens attaching portion (not illustrated) for detachably attaching the exchangeable lens 3 is formed on the front surface side of the imaging main body portion 23.

Figure 1:
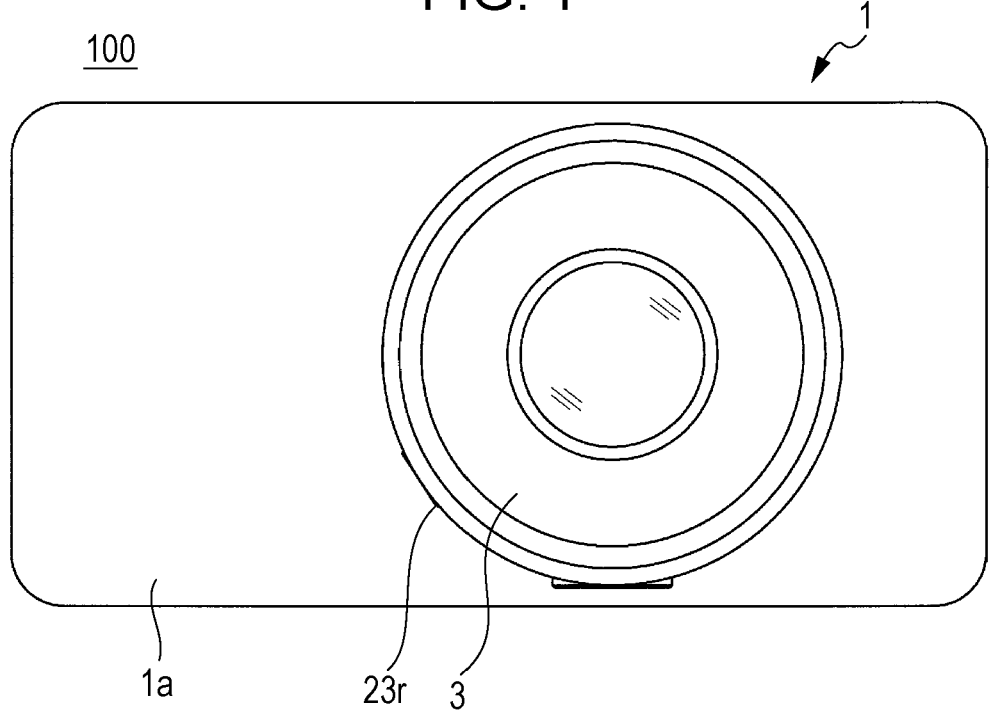
FIG. 1 is a front view of an imaging system as an embodiment.
Figure 2:
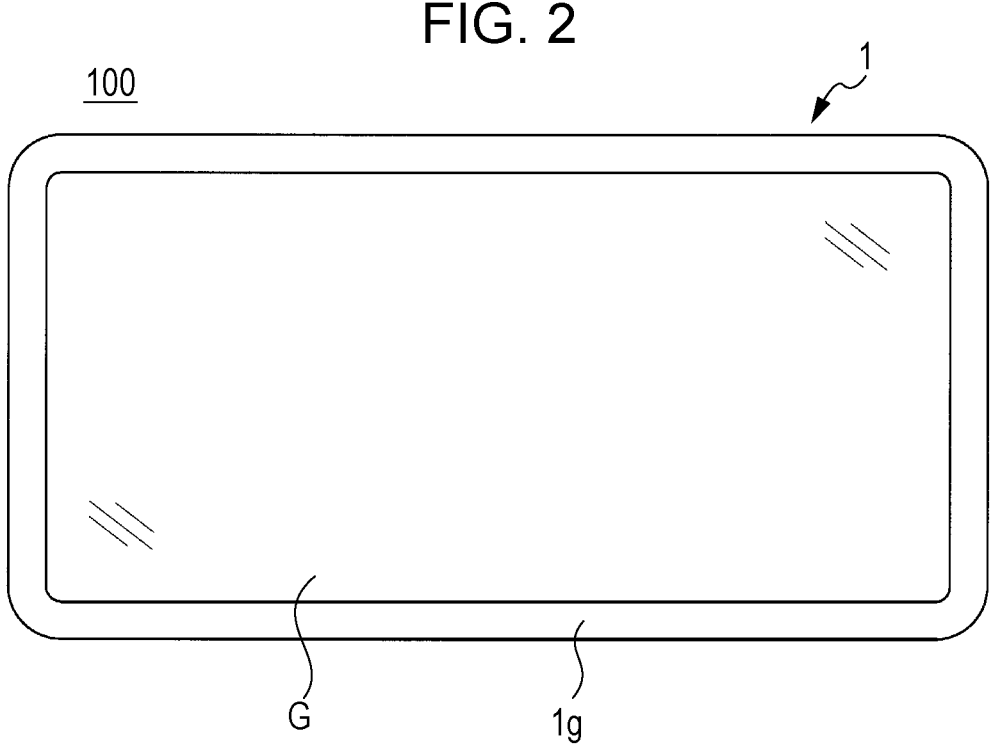
FIG. 2 is a rear view of the imaging system as the embodiment.
Figure 6:
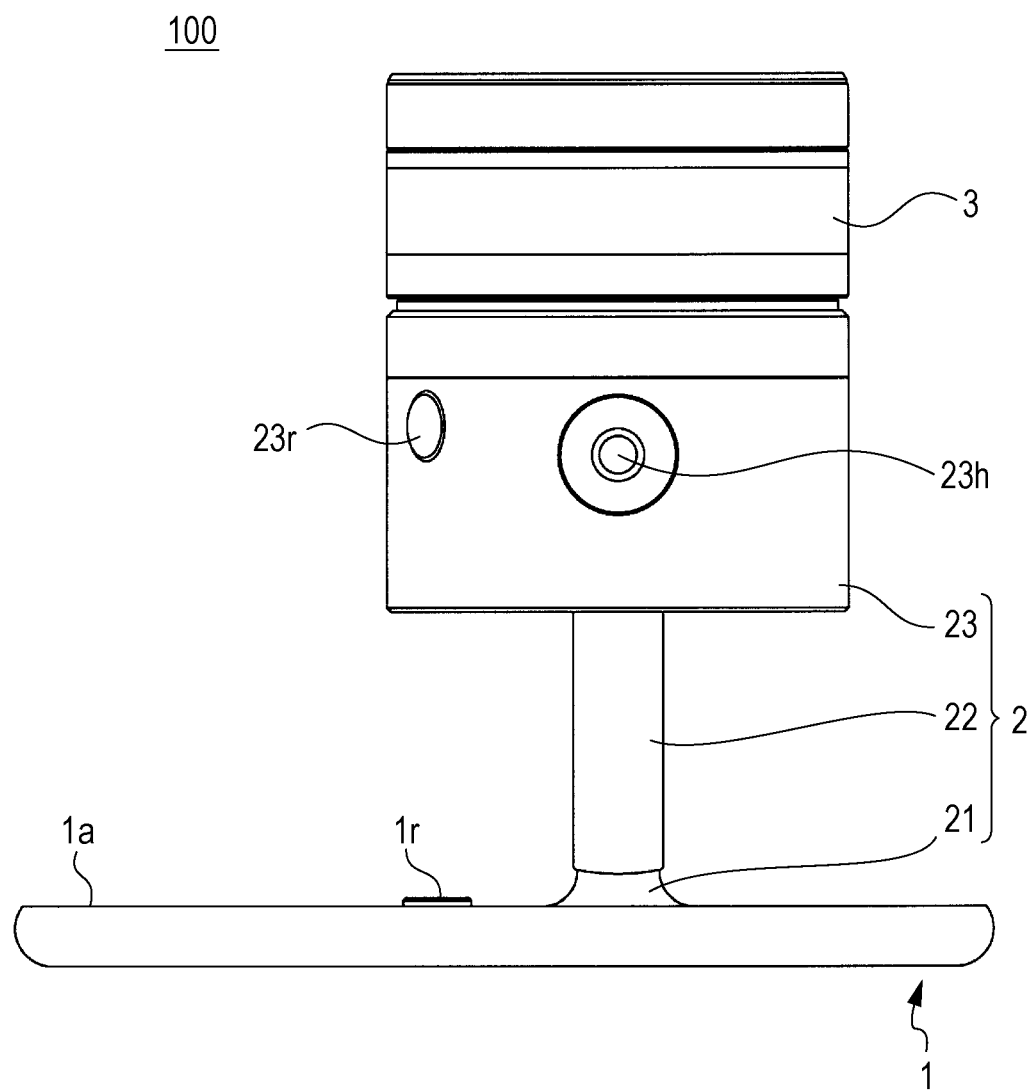
FIG. 6 is a bottom view of the imaging system as the embodiment.
Figure 14:
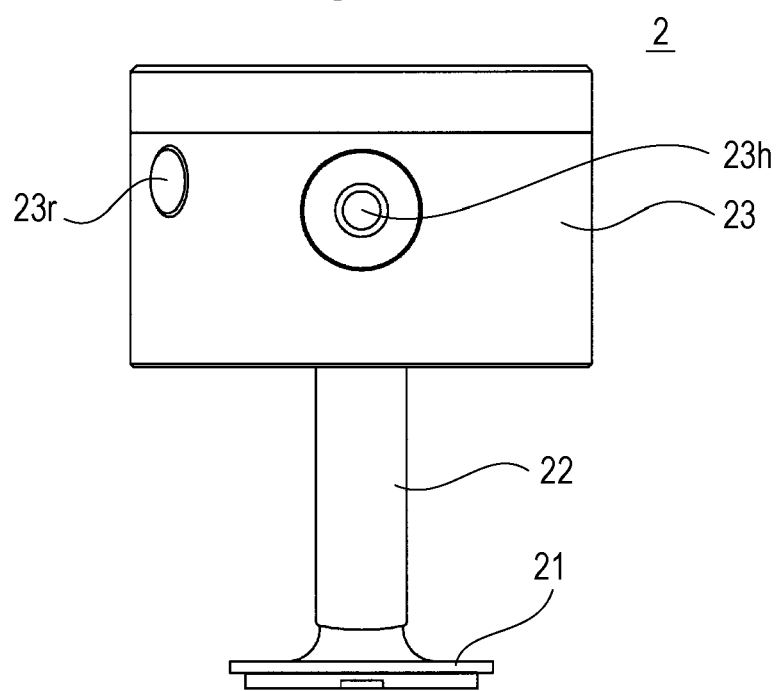
FIG. 14 is a bottom view of the imaging unit as the embodiment.

In addition, a tripod hole 23h for enabling an attachment with respect to a tripod or the like is formed on the imaging main body portion 23 (refer to FIGS. 6 and 14). The tripod hole 23h is formed such that an opening surface thereof is exposed to a lower end portion of the imaging main body portion 23.

Further, a release button 23r for setting the exchangeable lens 3 to be brought into a detached state is also formed on the imaging main body portion 23 (refer to FIG. 1, FIG. 3, FIGS. 6 to 11, and FIG. 14).

Furthermore, the attached portion 21 and the rotational member 22 provided in the imaging unit 2 will be described later.

The exchangeable lens 3 is detachably attached to the imaging main body portion 23 of the imaging unit 2. The exchangeable lens 3 is attached to the imaging main body portion 23, and thus a subject image is formed on the imaging surface of the imaging element 23i.

2. Rotational Mechanism

Figure 15:
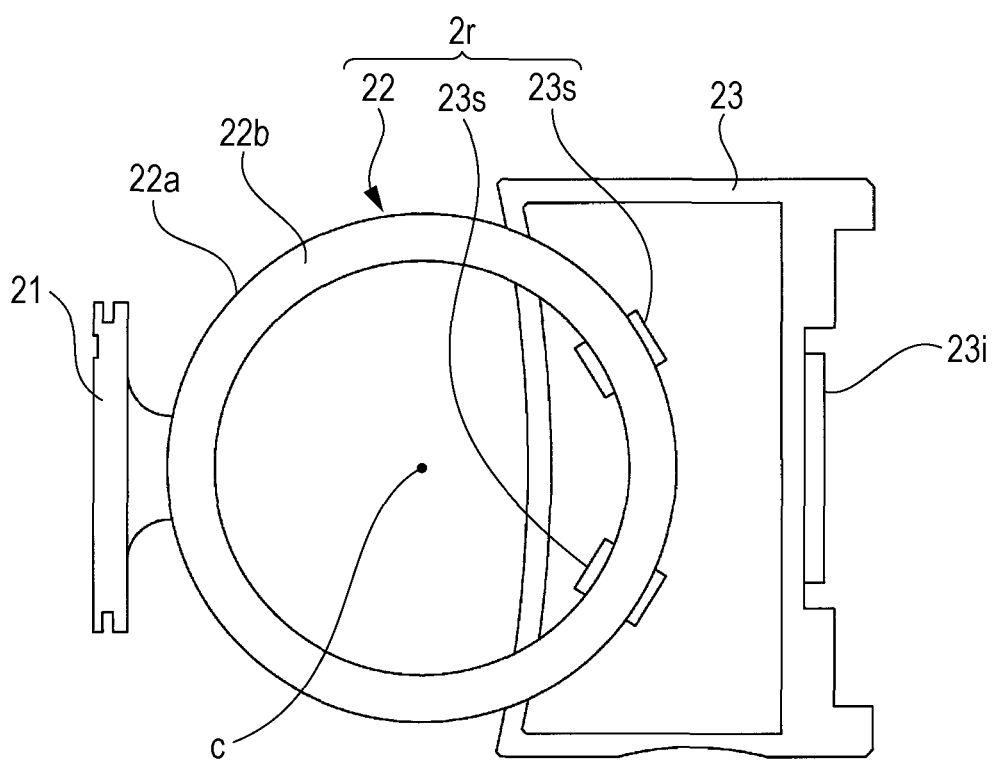
FIG. 15 is a sectional view of the imaging unit as the embodiment cut along line XV-XV of FIG. 9.

FIG. 15 is a sectional view of the imaging unit 2 when the imaging unit 2 is cut along line XV-XV illustrated in FIG. 9.

In the imaging unit 2, the attached portion 21 and the imaging main body portion 23 are connected by a rotational mechanism 2r including the rotational member 22.

Specifically, the rotational mechanism 2r includes the rotational member 22, and sliding retaining units 23s and 23s. The rotational member 22 is formed as an arc-like portion 22a in which at least a part of an outer circumference is bent into the shape of an arc. Specifically, in the rotational member 22 of this example, the arc-like portion 22a is formed over the whole circumference of the rotational member 22. The rotational member 22 of this example is formed as an arc-like rail portion 22b in which the whole circumference thereof is bent into the shape of an arc. In other words, the rotational member 22 of this example is a ring-shaped member. The outer circumference portion of the ring-shaped member, that is, an outer circumference portion of the arc-like rail portion 22b is the arc-like portion 22a.

In the rotational member 22, an outer circumference surface of one end side thereof is bonded to the attached portion 21. That is, the rotational member 22 is supported from the attached portion 21 side.

In addition, in the rotational member 22, a part of the arc-like rail portion 22b is inserted into the imaging main body portion 23.

The sliding retaining units 23s and 23s are disposed in the imaging main body portion 23, and slidably retain the arc-like rail portion 22b of the rotational member 22 inserted as described above. The sliding retaining units 23s and 23s are supported from a housing side of the imaging main body portion 23. In addition, surfaces of the sliding retaining units 23s and 23s on a side where the sliding retaining units 23s and 23s come in contact with the rotational member 22 are formed, for example, of a material having a relatively high friction coefficient such as rubber.

According to the rotational mechanism 2r configured as described above, the imaging main body portion 23 is able to be rotated around a center c of an arc of the arc-like portion 22a as a rotational center (a rotational axis).

Figure 16A:
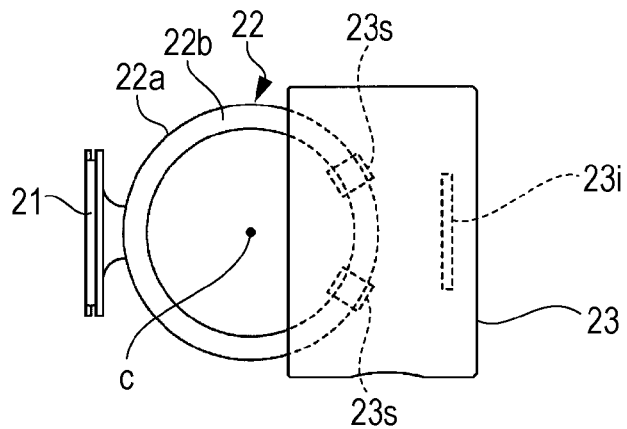
FIGS. 16A to 16C are diagrams illustrating a condition of rotation of an imaging main body portion according to a rotational mechanism.
Figure 16B:
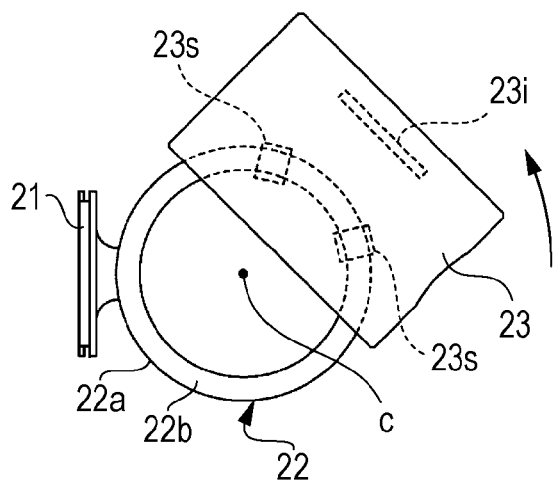
Figure 16C:
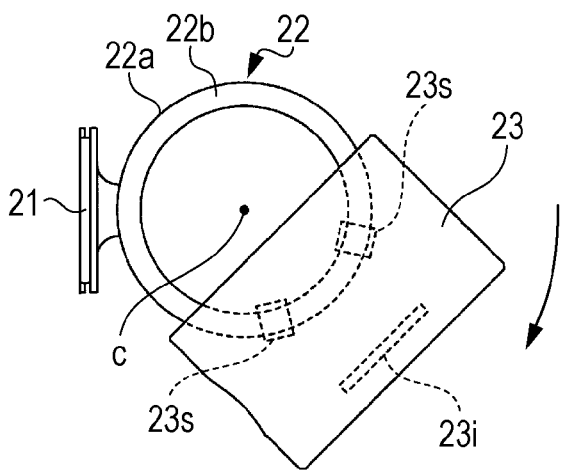

Specifically, when the state in which the imaging direction (in this example, a direction toward which the imaging surface faces) of the imaging element 23i illustrated in FIG. 16A is the front direction is set as a standard, the imaging main body portion 23 is able to be rotated in a direction in which the imaging direction faces toward an upper portion/a lower portion of paper as illustrated in each left side view of FIGS. 16B and 16C.

Furthermore, hereinafter, the center c which is the rotational center of the imaging main body portion 23 is referred to as the "rotational axis".

At this time, the surfaces of the sliding retaining units 23s and 23s on the side where the sliding retaining units 23s and 23s come in contact with the rotational member 22 are formed of a material having a relatively high friction coefficient, and thus the imaging main body portion 23 does not rotate unless the user applies a force greater than or equal to a certain level. In other words, the imaging main body portion 23 is not rotated by gravity.

As described above, according to the rotational mechanism 2r, the imaging main body portion 23 is able to be rotated around the center c of the arc of the arc-like portion 22a as the rotational center in a direction in which the imaging direction of the imaging element 23i is changed. Specifically, according to the rotational mechanism 2r of this example including the arc-like rail portion 22b and the sliding retaining units 23s, the imaging main body portion 23 is able to be rotated along the arc of the arc-like portion 22a.

Here, as understood by referring to FIG. 15, in the imaging unit 2 provided with the above rotational mechanism 2r, when viewed from a direction in which the rotational axis of the imaging main body portion 23 by the rotational mechanism 2r is viewed as a point (seen as a point), the imaging main body portion 23 is superposed on a circle which has the same center and the same radius as the arc of the arc-like portion 22a. In other words, the imaging main body portion 23 is superposed on a circle which has a center identical to the center c of the arc of the arc-like portion 22a and a radius identical to a radius of the arc of the arc-like portion 22a.

Furthermore, the "direction in which the rotational axis is viewed as a point" indicates a "direction parallel to a direction to which the rotational axis extends".

3. Shape of Back Surface of Imaging Main Body Portion

As illustrated in the sectional view of FIG. 15, in the imaging unit 2 of this embodiment, a back surface of the imaging main body portion 23, that is, a surface of the imaging main body portion 23 on a side where the imaging main body portion 23 faces the rotational member 22 is bent into the shape of a mortar. Then, mirror-like finishing is performed with respect to a portion bent in this manner.

Accordingly, when the imaging unit 2 is observed from the back surface side, the rotational member 22 (the arc-like rail portion 22b) projects onto the back surface side of the imaging main body portion 23.

Accordingly, visual effects as if a portion of the arc-like rail portion 22b which is inserted into the imaging main body portion 23 is continuous with an exposed portion of the arc-like rail portion 22b are able to be provided to the user.

4. Attaching Portion and Attached Portion

Figure 17A:
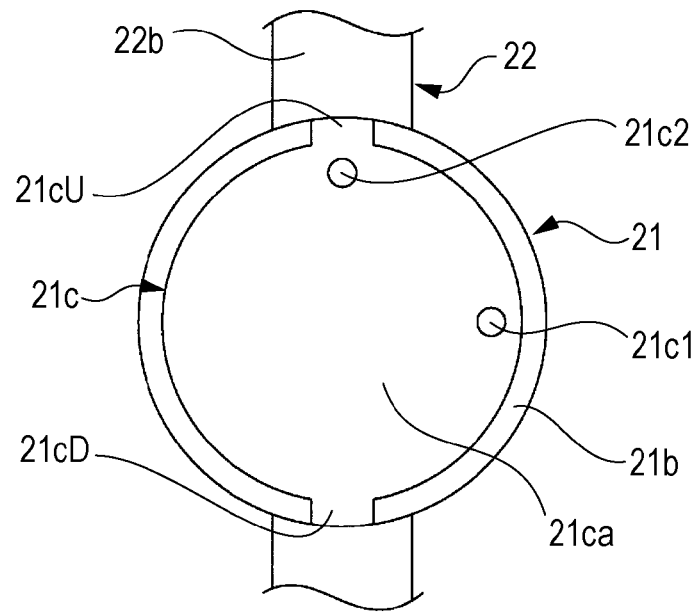
FIG. 17A is an enlarged view of a back surface of the imaging unit.
Figure 17B:
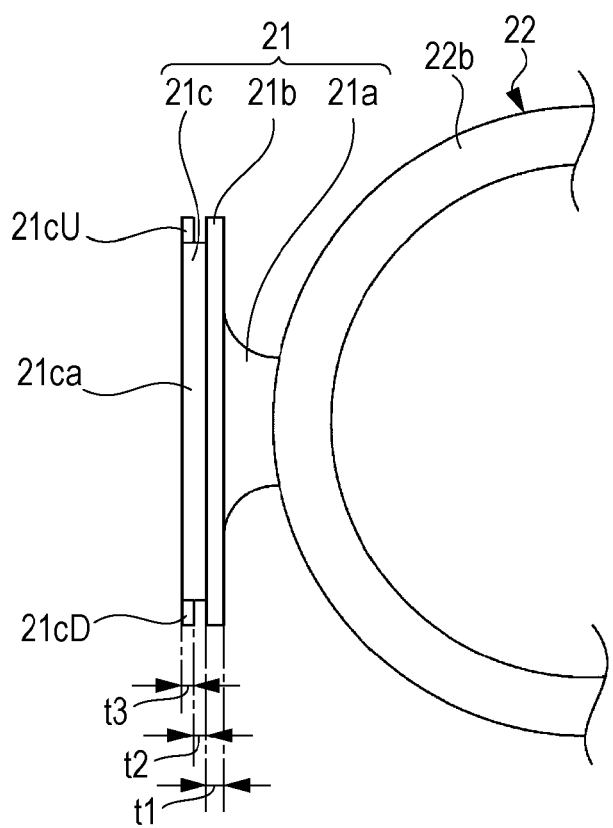
FIG. 17B is a left side view in which the vicinity of a bonding portion between an attached portion and a rotational member of the imaging unit is enlarged.

FIG. 17A is an enlarged view of a back surface of the imaging unit 2, and FIG. 17B is a left side view in which the vicinity of a bonding portion between an attached portion 21 and a rotational member 22 of the imaging unit 2 is enlarged.

As illustrated in FIGS. 17A and 17B, the attached portion 21 of the imaging unit 2 includes a pedestal portion 21a in which the rotational member 22 is bonded on a front surface side thereof, a disk-like lid portion 21b formed on a back surface side of the pedestal portion 21a, and an insertion portion 21c formed on the back surface side of the lid portion 21b. Furthermore, a thickness of the lid portion 21b is "t1".

The insertion portion 21c includes a disk portion 21ca having an outer diameter smaller than an outer diameter of the lid portion 21b, an upper side convex portion 21cU formed such that an upper end portion of the disk portion 21ca on the back surface side protrudes to an upper side, and a lower side convex portion 21cD formed in a position which is vertically symmetrical with the upper side convex portion 21cU.

Furthermore, an up and down direction of the imaging unit 2 is coincident with a vertical direction of the imaging element 23i (that is, a longitudinal direction of the captured image) in a state where the rotation angle of the imaging main body portion 23 is adjusted such that the imaging direction of the imaging element 23i is the front direction as illustrated in FIG. 16A.

In FIG. 17B, thicknesses of the upper side convex portion 21cU and the lower side convex portion 21cD are identical to each other as "t3", and are smaller than a thickness of the disk portion 21ca. For this reason, a void due to a thickness "t2" is formed between the lid portion 21b and the upper side convex portion 21cU, and between the lid portion 21b and the lower side convex portion 21cD.

In the insertion portion 21c, an outer diameter of a portion in which the upper side convex portion 21cU and the lower side convex portion 21cD are formed is larger than the outer diameter of the disk portion 21ca, and is identical to the outer diameter of the lid portion 21b.

In addition, a first pin receiving portion 21c1 and a second pin receiving portion 21c2 are formed on a back surface of the disk portion 21ca. The second pin receiving portion 21c2 is formed in the vicinity of an upper end portion of the back surface of the disk portion 21ca (in the vicinity of a root of the upper side convex portion 21cU). The first pin receiving portion 21c1 is formed in a position advanced by 45 degrees in a clockwise direction from a position in which the second pin receiving portion 21c2 is formed when viewed from the back surface side.

Figure 18A:
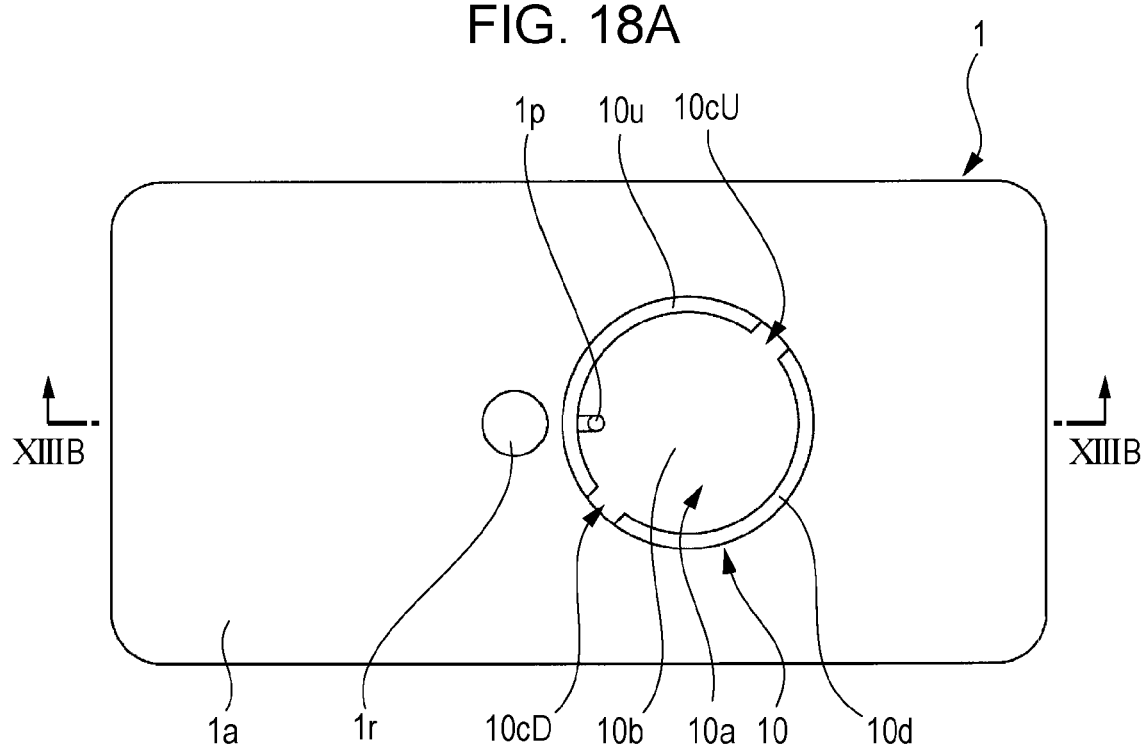
FIG. 18A is a front view of a display apparatus.
Figure 18B:
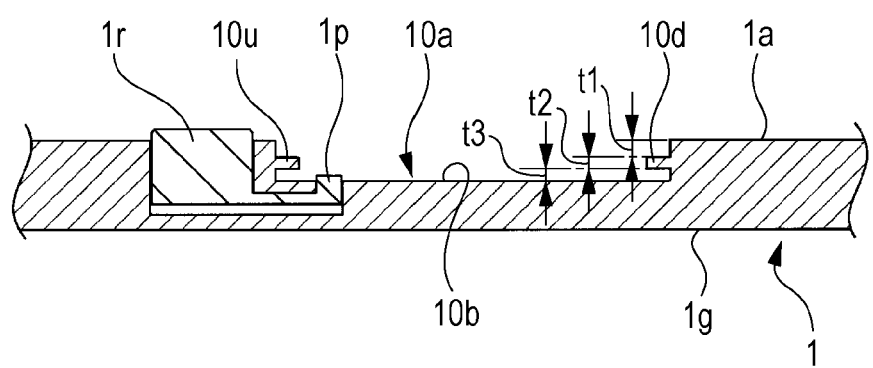
FIG. 18B is a sectional view of the display apparatus cut along line XIIIB-XIIIB of FIG. 18A.

FIG. 18A is a front view of a display apparatus 1, and FIG. 18B is a sectional view of the display apparatus 1 when the display apparatus 1 is cut along line XIIIB-XIIIB of FIG. 18A.

The attaching portion 10 of the display apparatus 1 includes a concave portion 10a opened in the shape of a circle, an upper side eaves portion 10u and a lower side eaves portion 10d which slightly protrude toward a central axis side of the concave portion 10a, an upper side guide groove 10cU and a lower side guide groove 10cD, and a pin 1p.

The upper side eaves portion 10u and the lower side eaves portion 10d are partitioned by the upper side guide groove 10cU and the lower side guide groove 10cD. The upper side guide groove 10cU and the lower side guide groove 10cD are arranged at intervals of 180 degrees in a plane in parallel with the front surface 1a. In this example, a line connecting the upper side guide groove 10cU and the lower side guide groove 10cD is not coincident with an up and down direction (a longitudinal direction) of the display apparatus 1, and is inclined at a predetermined angle (indicated as "X degrees") in a clockwise direction from the longitudinal direction when viewed from the front surface side.

As illustrated in FIG. 18B, a step of which a thickness is approximately "t1" is formed between the front surface 1a and the upper side eaves portion 10u of the display apparatus 1, and between the front surface 1a and the lower side eaves portion 10d. In addition, thicknesses of the upper side eaves portion 10u and the lower side eaves portion 10d are approximately "t2", respectively, and a step of which a thickness is approximately "t3" is formed between a bottom surface 10*b* of the concave portion 10*a* and the upper side eaves portion 10*u*, and between the bottom surface 10*b* and the lower side eaves portion 10*d*.

In addition, the pin 1*p* protrudes from the bottom surface 10*b* of the concave portion 10*a*. The pin 1*p* protrudes toward the front surface side in the vicinity of a left side end portion of the bottom surface 10*b*.

The pin 1*p* is connected to the release button 1*r* in an inner portion of the display apparatus 1. The pin 1*p* and the release button 1*r* are urged against the front surface side even though it is not illustrated, and thus the release button 1*r* protrudes toward the front surface side from the front surface 1*a*, and the pin 1*p* protrudes toward the front surface side from the bottom surface 10*b*, respectively, in a state where the release button 1*r* is not manipulated. When the release button 1*r* is pressed, a tip end portion of the pin 1*p* is drawn into the back surface 1*g* side from the bottom surface 10*b*.

An attachment of the imaging unit 2 with respect to the display apparatus 1 will be described.

The user inserts the upper side convex portion 21*c*U of the attached portion 21 into the upper side guide groove 10*c*U of the attaching portion 10 and the lower side convex portion 21*c*D of the attached portion 21 into the lower side guide groove 10*c*D of the attaching portion 10, respectively, and causes the back surface of the attached portion 21 (that is the back surface of the disk portion 21*ca*) to come in contact with the bottom surface 10*b* of the concave portion 10*a* of the attaching portion 10, in a state where the back surface of the imaging unit 2 faces the front surface 1*a* of the display apparatus 1. In this state, when the imaging unit 2 is rotated by X degrees in a counterclockwise direction at the time of being viewed from the front surface side, the tip end portion of the pin 1*p* is fitted into the first pin receiving portion 21*c*1 formed in the disk portion 21*ca*. Accordingly, the rotation of the imaging unit 2 is locked.

Figure 19:
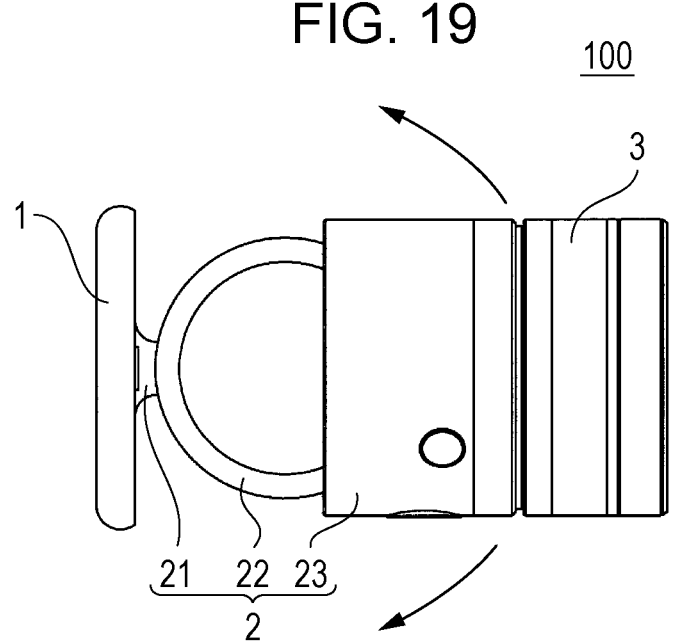
FIG. 19 is a left side view of the imaging system when the imaging unit is attached to the display apparatus in a first attachment state.

Thus, in a state where the pin 1*p* is fitted into the first pin receiving portion 21*c*1, as illustrated in a left side view of FIG. 19, an approximately semicircular cavity portion formed on an inner circumference side of the rotational member 22 is in a state of facing toward a right and left direction. That is, an extending direction of the rotational axis of the imaging main body portion 23 is in a state of coinciding with the right and left direction, and the rotation direction of the imaging main body portion 23 is a direction of the upper side/the lower side when viewed from the front surface side.

Hereinafter, an attachment state where the pin 1*p* is fitted into the first pin receiving portion 21*c*1 is indicated as a "first attachment state".

In the first attachment state, the vertical direction of the imaging element 23*i* and the up and down direction of the display apparatus 1 are coincident with each other, in a state where the rotation angle of the imaging main body portion 23 is adjusted such that the imaging direction of the imaging element 23*i* is the front direction.

When the user presses the release button 1*r* in the first attachment state, a fitting state of the pin 1*p* with respect to the first pin receiving portion 21*c*1 is able to be released, and thus the imaging unit 2 is able to be in a state of being rotatable again.

When the fitting state of the pin 1*p* with respect to the first pin receiving portion 21*c*1 is released in this manner, and the imaging unit 2 is rotated by 90 degrees in a counterclockwise direction at the time of being viewed from the front surface side, the tip end portion of the pin 1*p* is fitted into the second pin receiving portion 21*c*2, and the rotation of the imaging unit 2 is locked again.

Figure 20:
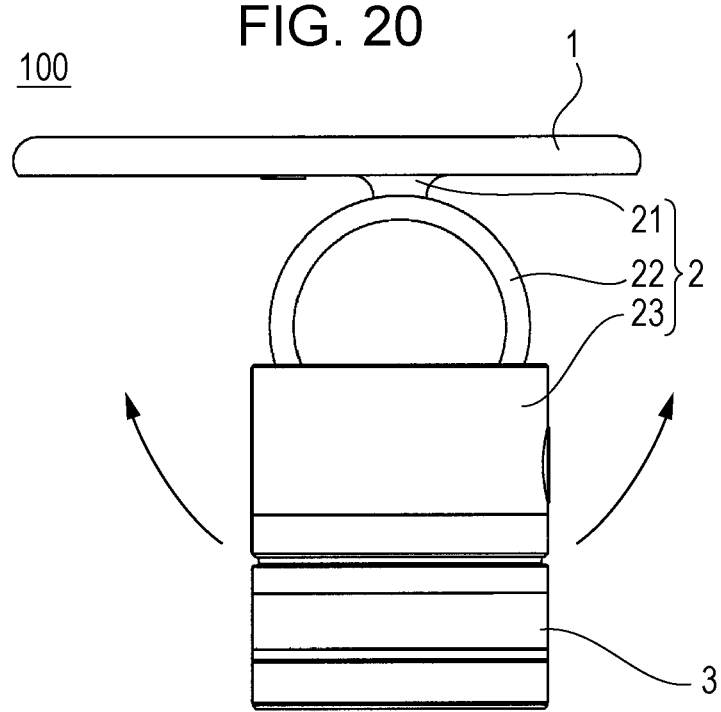
FIG. 20 is a plan view of the imaging system when the imaging unit is attached to the display apparatus in the first attachment state.

FIG. 20 is a plan view of the imaging system 100 in a state where the pin 1*p* is fitted into the second pin receiving portion 21*c*2. In the state where the pin 1*p* is fitted into the second pin receiving portion 21*c*2 in this manner, the cavity portion formed on the inner circumference side of the rotational member 22 is in a state of facing toward the up and down direction. That is, the extending direction of the rotational axis of the imaging main body portion 23 is coincident with the up and down direction, and the rotation direction of the imaging main body portion 23 is a right side/left side direction when viewed from the front surface side.

Hereinafter, an attachment state where the pin 1*p* is fitted into the second pin receiving portion 21*c*2 is indicated as a "second attachment state".

In the second attachment state, the vertical direction of the imaging element 23*i* is coincident with the right and left direction of the display apparatus 1, in the state where the rotation angle of the imaging main body portion 23 is adjusted such that the imaging direction of the imaging element 23*i* is the front direction.

Figure 21:
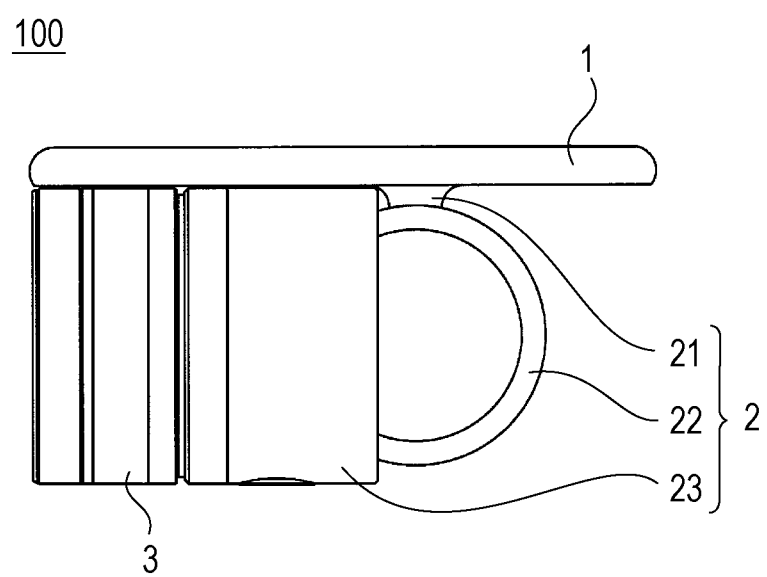
FIG. 21 is a plan view of the imaging system when the imaging main body portion is folded in parallel with the display apparatus.

Here, in the second attachment state, the imaging main body portion 23 is rotated in a left side direction when viewed from the front surface side, and thus the imaging main body portion 23 (and the exchangeable lens 3 attached to the imaging main body portion 23) is able to be folded in parallel with the display apparatus 1, as illustrated in a plan view of FIG. 21. The imaging main body portion 23 is folded in parallel with the display apparatus 1 in this manner, and thus it is possible to carry the imaging system 100 in a compact state. For example, when the imaging is finished and the imaging system 100 is carried, it is considered that the imaging system 100 is housed in a case or the like, and at this time, it is preferable that a space necessary for housing be able to be compact.

As described above, the attached portion 21 formed in the imaging unit 2 is configured to be attachable with respect to the attaching portion 10 at different attachment angles. Specifically, the attached portion 21 in this example is configured for enabling the attachment angle with respect to the attaching portion 10 to be changed such that the first attachment state in which the direction of the rotational axis of the imaging main body portion 23 is coincident with the up and down direction, and the second attachment state in which the direction of the rotational axis of the imaging main body portion 23 is coincident with the right and left direction are realized as the attachment states with respect to the attaching portion 10.

5. Conclusion and Effect

As described above, the imaging unit 2 in this embodiment includes the attached portion 21 which is detachably attached to the attaching portion 10 provided in the display apparatus 1 including the display screen G, and the imaging main body portion 23 including the imaging element 23*i*. In addition, the imaging unit 2 in this embodiment is provided with the rotational mechanism 2*r* which includes the rotational member 22 formed as the arc-like portion 22*a* in which at least a part of the outer circumference is bent into the shape of an arc, and connects the attached portion 21 and the imaging main body portion 23 such that the imaging main body portion 23 is able to be rotated around the center c of the arc of the arc-like portion 22*a* as the rotational center in the direction in which the imaging direction of the imaging element 23*i* is changed. Then, when viewed from the direction in which the rotational axis of the imaging main body portion 23 by the rotational mechanism 2*r* is viewed as a point, the imaging main body portion 23 is superposed on a circle which has the same center and the same radius as the arc of the arc-like portion 22*a*.

Accordingly, an interval between the imaging main body portion 23 and the display apparatus 1 in the imaging state is narrowed.

A point in which the interval between the imaging main body portion 23 and the display apparatus 1 is narrowed by the imaging unit 2 of this embodiment will be described with reference to FIGS. 22A to 22C and FIGS. 23A and 23B. Furthermore, in the following description, the same reference numerals are applied to the same portions as the described portions, and the description thereof will be omitted.

Figure 22A:
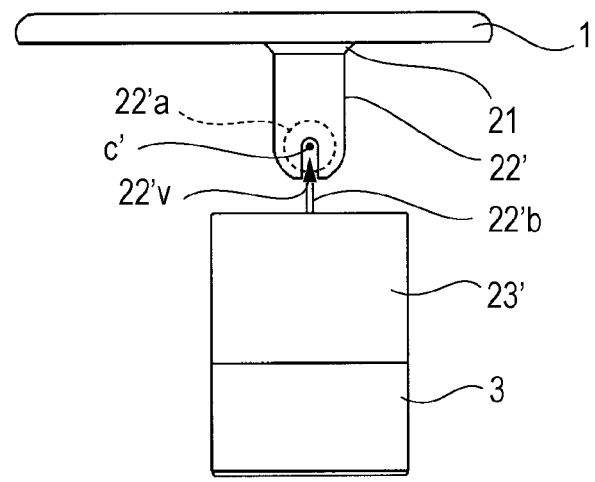
FIG. 22A is a plan view of the imaging system in which the rotational mechanism is substituted by a ball joint.
Figure 22B:
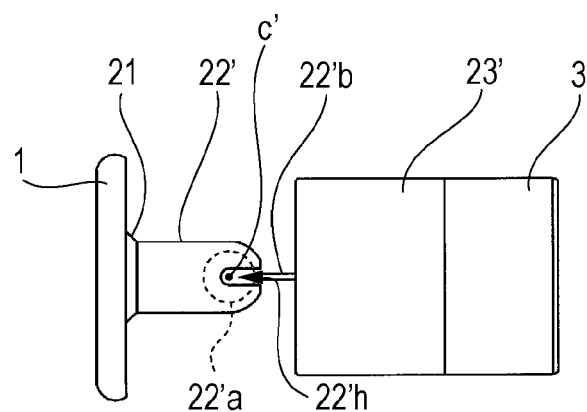
FIG. 22B is a left side view thereof.
Figure 22C:
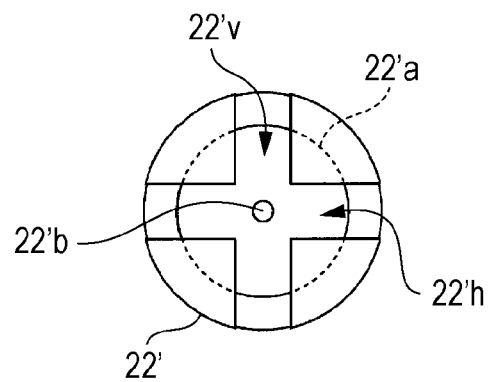
FIG. 22C is an enlarged view of a tip end portion on a front surface side of the ball joint.

FIGS. 22A and 22B are a plan view and a left side view of an imaging system 100' in which the rotational mechanism 2*r* is substituted by a ball joint. Furthermore, an imaging main body portion 23' is different from the imaging main body portion 23 in that the imaging main body portion 23' is not configured as the imaging main body portion 23 in which the rotational member 22 is inserted into the inner portion.

In the imaging system 100', a ball retaining portion 22' for slidably retaining a ball 22'*a* in the inner portion is disposed, instead of the rotational member 22. One end of a rod-like joint portion 22'*b* is bonded to the ball 22'*a*, and the other end of the joint portion 22'*b* is bonded to a back surface of the imaging main body portion 23'.

A longitudinal direction groove 22'*v* and a traverse direction groove 22'*h* are formed on a tip end portion of a front surface side of the ball retaining portion 22' in a longitudinal direction and a traverse direction, respectively (refer to an enlarged view of FIG. 22C), and the joint portion 22'*b* is able to be rotated along the longitudinal direction groove 22'*v* and the traverse direction groove 22'*h*.

Accordingly, the imaging main body portion 23' is able to be rotated in an upper side/a lower side direction, and in a right side/a right side direction.

Here, when the ball joint is used, the imaging main body portion 23' is rotated around a center c' of the ball 22'*a* as a rotational center along a circular arc of an outer circumference portion of the ball 22'*a*. Accordingly, when the ball joint is used, a circular arc portion of the outer circumference of the ball 22'*a* corresponds to the arc-like portion 22*a* of the rotational member 22.

Figure 23A:
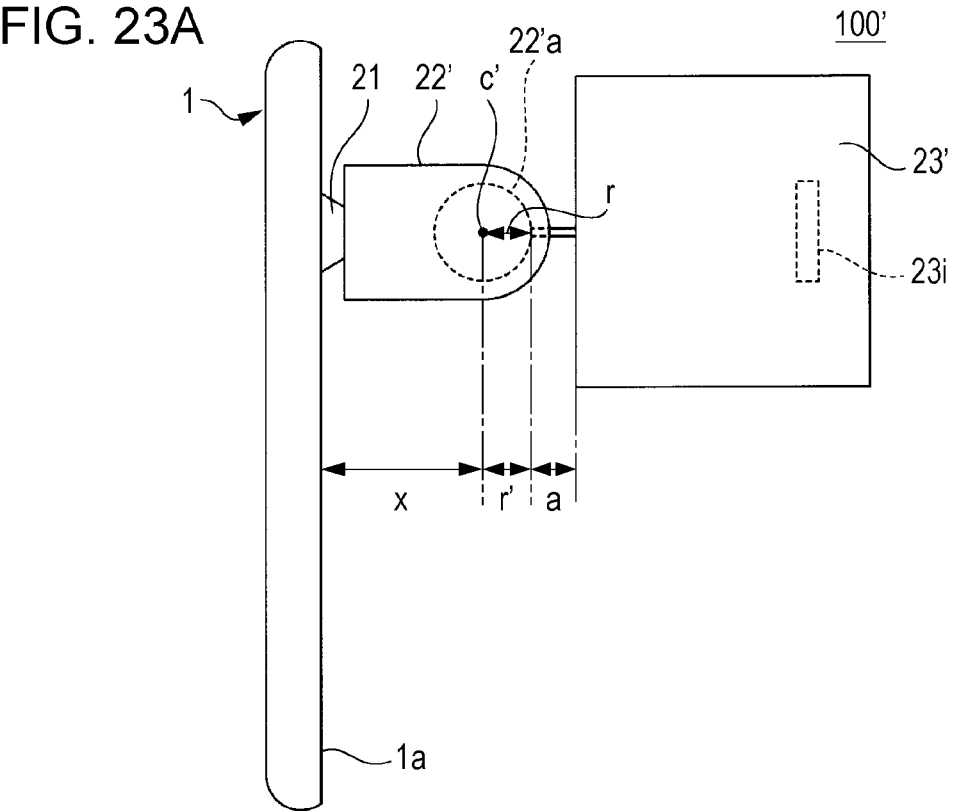
FIG. 23A is a plan view schematically illustrating a state in which a rotation angle of the imaging main body portion is adjusted such that an imaging direction of the imaging element is a front direction in the imaging system using the ball joint.
Figure 23B:
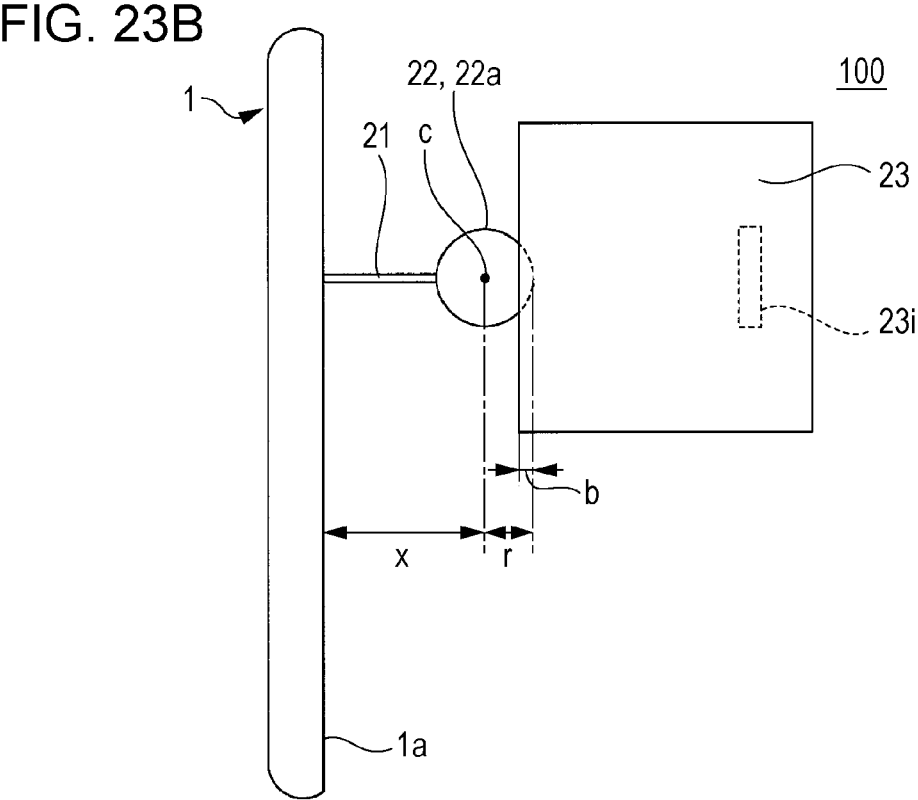
FIG. 23B is a plan view schematically illustrating a state in which the rotation angle of the imaging main body portion is adjusted such that the imaging direction of the imaging element is the front direction in the imaging system as the embodiment.

Regarding the respective imaging system 100' with the ball joint and imaging system 100, the interval between the display apparatus and the imaging main body portion in the imaging state is considered according to FIGS. 23A and 23B. Furthermore, in FIGS. 23A and 23B, the exchangeable lens 3 is not illustrated.

As a premise, in order to allow the imaging main body portions 23' and 23 to be rotated in a rotation range to some extent, it is necessary that the centers c' and c be disposed on an external side to some extent from the front surface 1*a* of the display apparatus 1. When the interval between the front surface 1*a* and the centers c' and c is too narrow, the imaging main body portions 23' and 23 interfere with the display apparatus 1, and thus the rotation is restricted.

According to a condition in which sizes of the imaging main body portions 23' and 23 and a rotation acceptable range are identical to each other, the distance from the front surface 1*a* to the centers c' and c is identical to "x" illustrated in the drawings.

The interval between the display apparatus 1 and the imaging main body portions 23' and 23 becomes the maximum in the state where the rotation angle of the imaging main body portions 23' and 23 is adjusted such that the imaging direction of the imaging element 23*i* is the front direction as illustrated in FIGS. 23A and 23B.

At this time, in the imaging system 100', the imaging main body portion 23' is not directed bonded to the ball 22'*a*, but is bonded to the ball 22'*a* through the joint portion 22'*b*. For this reason, a maximum value of the interval between the display apparatus 1 and the imaging main body portion 23' of the imaging system 100' is x+r'+a when a radius of the ball 22'*a* is set as "r'", and a length of the joint portion 22'*b* is set as "a".

On the other hand, in a case of the imaging system 100, a part of the arc-like portion 22*a* of the rotational member 22 is inserted into the imaging main body portion 23. In other words, when viewed from the direction in which the rotational axis of the imaging main body portion 23 by the rotational mechanism 2*r* is viewed as a point, the imaging main body portion 23 is superposed on a circle which has the same center and the same radius as the arc of the arc-like portion 22*a*. When a length of the superposed portion is set as "b", and a radius of the arc of the arc-like portion 22*a* is set as "r", the maximum value of the interval between the display apparatus 1 and the imaging main body portion 23 of the imaging system 100 is x+(r−b).

Thus, according to the imaging unit 2 of this embodiment, the interval between the imaging main body portion 23 and the display apparatus 1 of the imaging state is narrowed under the same condition in which each of distances from the display apparatus 1 to the centers c' and c' are identical to each other, and the radius r' of the ball 22'*a* and the radius r of the arc of the arc-like portion 22*a* are identical to each other.

Accordingly, it is possible to make the imaging system 100 in the imaging state compact, and it is possible to improve stability on gripping the imaging system 100.

Figure 24:
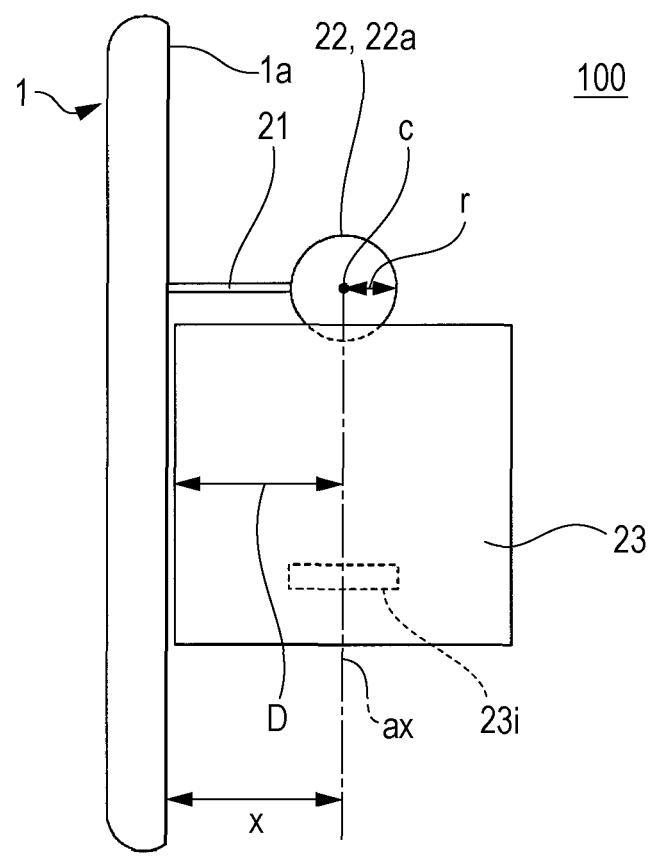
FIG. 24 is a plan view schematically illustrating a state in which the imaging main body portion is folded in parallel with the display apparatus in the imaging system as the embodiment.

Furthermore, in the imaging system 100 of this embodiment, the imaging main body portion 23 is able to be folded in parallel with the display apparatus 1, and a value of the distance x when the imaging main body portion 23 is able to be folded in parallel with the display apparatus 1 in this manner will be described with reference to FIG. 24. In FIG. 24, a plan view schematically illustrating a state in which the imaging main body portion 23 is folded in parallel with the display apparatus 1 is illustrated. Furthermore, in FIG. 24, the exchangeable lens 3 is not illustrated.

First, when the imaging system 100 is viewed from the direction in which the rotational axis of the imaging main body portion 23 is viewed as a point, an axis ax in the drawings is through the center c and in parallel with the imaging direction of the imaging element 23*i*.

In this example, the axis ax is coincident with a central axis of the imaging main body portion 23 formed in an approximately cylinder shape.

In addition, a distance D in the drawings is a maximum separation distance between the axis ax and a ridgeline on a rotation progressing direction side at the time of folding the imaging main body portion 23. As described above, in this example where the axis ax is coincident with the central axis of the imaging main body portion 23 formed in an approximately cylinder shape, the distance D corresponds to a radius of the imaging main body portion 23.

As understood with reference to FIG. 24, in order to enable the imaging main body portion 23 to be folded in parallel with the display apparatus 1, the distance x may be set to at least the distance D or greater.

The captured image creation unit 2 of this embodiment is configured such that the interval from the display apparatus 1 to the center c is greater than or equal to the distance D in a state of being attached to the display apparatus 1, and thus the imaging main body portion 23 is able to be folded in parallel with the display apparatus 1.

The imaging main body portion 23 is folded in parallel with the display apparatus 1, and thus it is possible to carry the imaging system 100 in the compact state.

In addition, in the imaging unit 2 of this embodiment, the attached portion 21 is configured to be attachable with respect to the attaching portion 10 at different attachment angles.

Accordingly, the direction of the rotational axis of the imaging main body portion 23 by the rotational mechanism 2r is able to be changed.

Accordingly, it is possible to improve rotational degrees of freedom of the imaging main body portion 23.

Further, in the imaging unit 2 of this embodiment, the rotational mechanism 2r includes a member formed as the arc-like rail portion 22b in which at least a part is bent into the shape of an arc as the rotational member 22, and includes the sliding retaining units 23s for slidably retaining the arc-like rail portion 22b.

Accordingly, the imaging main body portion 23 is rotated around the center c of the arc of the arc-like portion 22a as the rotational center according to sliding of the arc-like rail portion 22b in the sliding retaining units 23s.

Since the rail is configured to be slidably retained, for example, breakage resistance of a connection portion between the attached portion 21 and the imaging main body portion 23 is able to be improved, compared to a case of connecting the attached portion and the imaging main body portion through a rod-like member such as the joint portion 22'b of the ball joint.

In addition, by using the rotational member 22 in which the arc-like rail portion 22b is formed, the user is able to use the arc-like rail portion 22b as a handle, and thus it is easy to grip the imaging unit 2.

In addition, in the imaging unit 2 of this embodiment, the rotational member 22 is further supported from the attached portion 21 side, and the sliding retaining units 23s are disposed in the imaging main body portion 23.

Accordingly, it is not necessary to dispose the sliding retaining units 23s on the attached portion 21 side.

Accordingly, it is possible to miniaturize the attached portion 21.

In addition, in the imaging unit 2 of this embodiment, the surface of the imaging main body portion 23 on the side where the imaging main body portion 23 faces the rotational member 22 is bent into the shape of a mortar, and mirror-like finishing is performed with respect to the bent portion.

Accordingly, when the imaging unit 2 is observed from the back surface side, the rotational member 22 (the arc-like rail portion 22b) projects onto the back surface side of the imaging main body portion 23.

Accordingly, visual effects as if the portion of the arc-like rail portion 22b which is inserted into the imaging main body portion 23 is continuous with the exposed portion of the arc-like rail portion 22b are able to be provided to the user.

6. Modification Example

Furthermore, the present technology is not limited to the specific examples described above, and various modification examples are considered.

For example, in the above description, an example in which the axis ax and the central axis of the imaging main body portion 23 (hereinafter, indicated as a "central axis cax") are coincident with each other as illustrated in FIG. 24 is illustrated, but it is not necessary that the axis ax be coincident with the central axis cax.

Figure 25A:
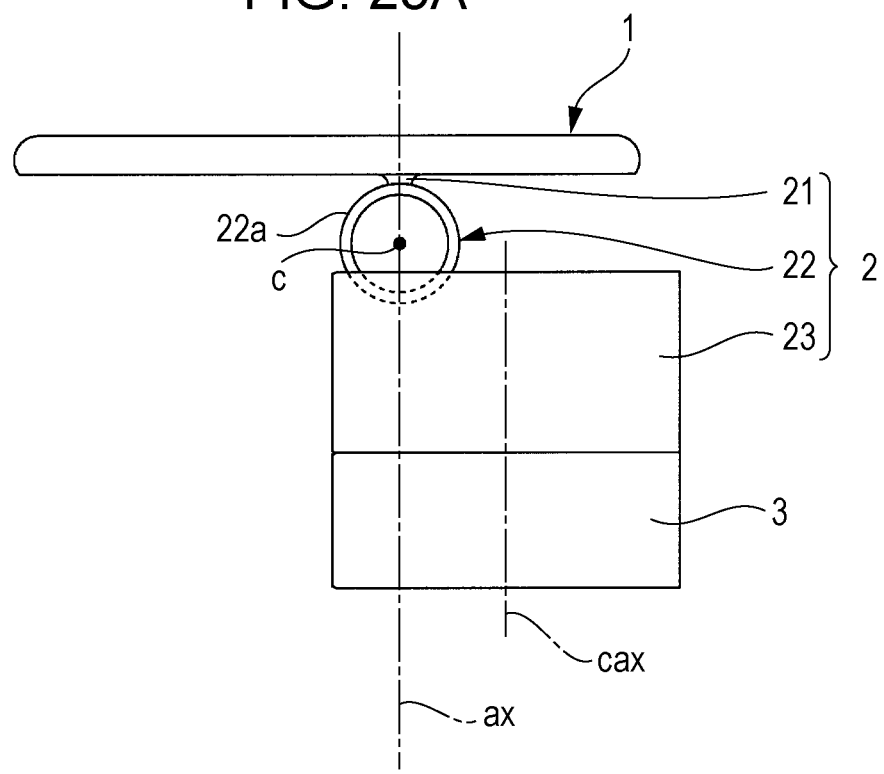
FIGS. 25A and 25B are all plan views of the imaging system.
Figure 25B:
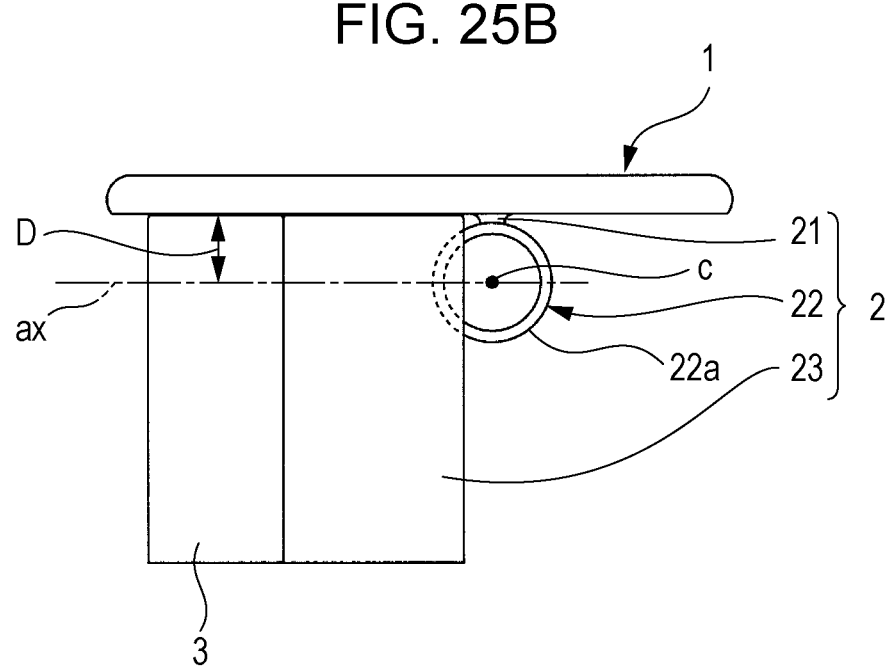

FIGS. 25A and 25B illustrate an example where the axis ax is shifted to a side where the imaging main body portion 23 is bent with respect to the center axis cax. FIG. 25A illustrates a state where the rotation angle of the imaging main body portion 23 is adjusted such that the imaging direction of the imaging element 23i is the front direction, and FIG. 25B illustrates a state where the imaging main body portion 23 is folded in parallel with the display apparatus 1, respectively. Furthermore, the exchangeable lens 3 is not illustrated.

As understood with reference to FIGS. 25A and 25B, the axis ax is shifted to the side where the imaging main body portion 23 is folded with respect to the central axis cax, and thus the radius of the arc-like portion 22a is able to be small. This is because the distance D is reduced compared to a case where the axis ax is coincident with the central axis cax.

By reducing the radius of the arc-like portion 22a, it is possible to further make the imaging system 100 compact, and it is possible to further improve stability on gripping the imaging system 100.

Figure 26A:
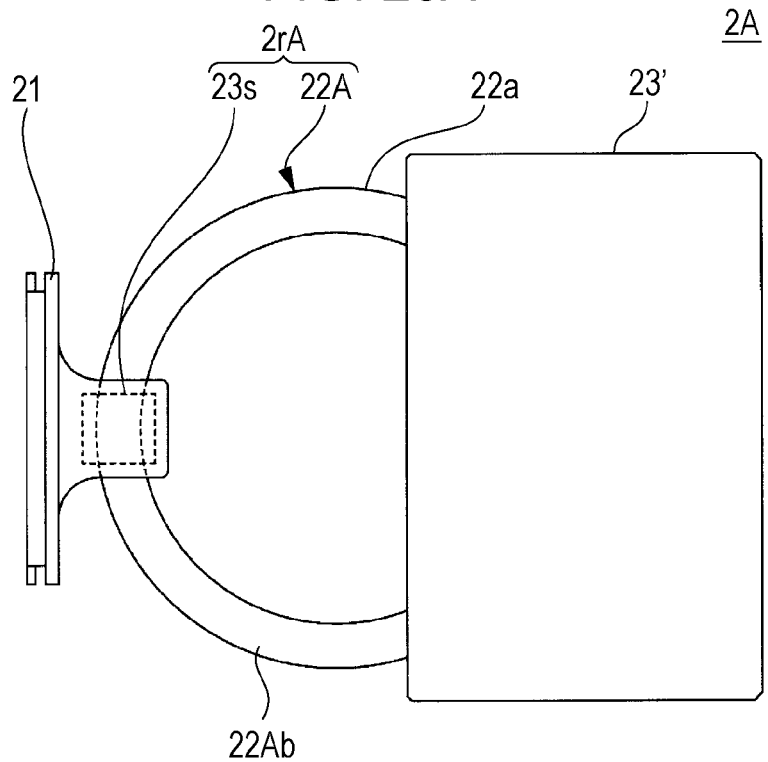
FIGS. 26A and 26B are all left side views of the imaging unit.

In addition, in the above description, a configuration in which the sliding retaining units 23s are disposed in the imaging main body portion 23 is illustrated, but the sliding retaining unit 23s may be disposed in the attached portion 21 as an imaging unit 2A illustrated in FIG. 26A. In this case, it is not necessary that a part of the rotational member 22 be inserted into the imaging main body portion 23, and thus a rotational member 22A including an arc-like rail portion 22Ab in which a part of a ring is cut as illustrated is able to be used. In addition, it is possible to use the imaging main body portion 23' (the imaging main body portion 23 into which the rotational member 22 is not able to be inserted) described above, instead of the imaging main body portion 23. In the arc-like rail portion 22Ab, an end surface of a portion in which a part of the ring is cut is bonded to the back surface of the imaging main body portion 23', and the rotational member 22A is supported from the imaging main body portion 23' side. The arc-like portion 22a of the rotational member 22A is not formed over a circumference, and is in the shape of an approximate semicircle.

In this case, a rotational mechanism 2rA is formed by the rotational member 22A and the sliding retaining unit 23s disposed in the attached portion 21.

Furthermore, in the above description, only one sliding retaining unit 23s is disposed, but a plurality of sliding retaining units 23s may be disposed.

In the imaging unit 2A as described above, when viewed from a direction in which the rotational axis of the imaging main body portion 23' by the rotational mechanism 2rA is viewed as a point, the imaging main body portion 23' is superposed on a circle which has the same center and the same radius as the arc of the arc-like portion 22a. Accordingly, similar to the case of the imaging unit 2, it is possible to make the imaging system in the imaging state compact, and it is possible to improve stability on gripping the imaging system.

In addition, according to the imaging unit 2A, it is not necessary to secure a space in the inner portion of the imaging main body portion 23' into which a part of the rotational member 22A is inserted, and thus it is possible to miniaturize the imaging main body portion 23'.

Furthermore, as understood from the description with respect to the imaging unit 2A, in the present technology, it is not necessary to form the arc-like portion 22a over a circumference.

Figure 26B:
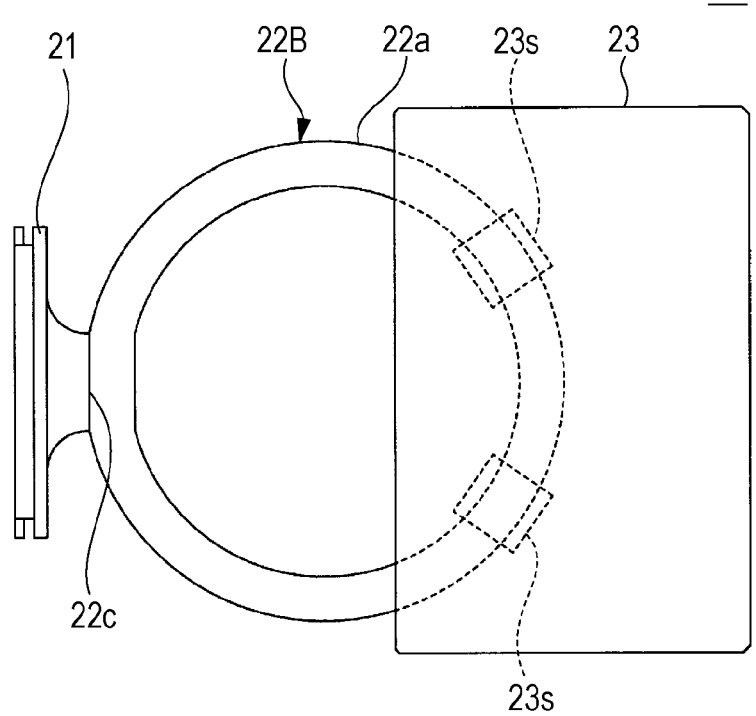

For example, as an imaging unit 2B illustrated in FIG. 26B, a rotational member 22B including a linear portion 22c in a part of the outer circumference may be used.

Furthermore, to what extent the arc-like portion 22a is disposed over a circumference may be determined according to, for example, how to set the rotation acceptable range of the imaging main body portion 23 (or 23').

In addition, in the above description, the imaging system 100 in which the imaging unit 2 is attachable and detachable with respect to the display apparatus 1 is illustrated, but for example, the imaging unit 2 may be configured as an integrated imaging apparatus by being undetachably bonded to the display apparatus 1.

Figure 27A:
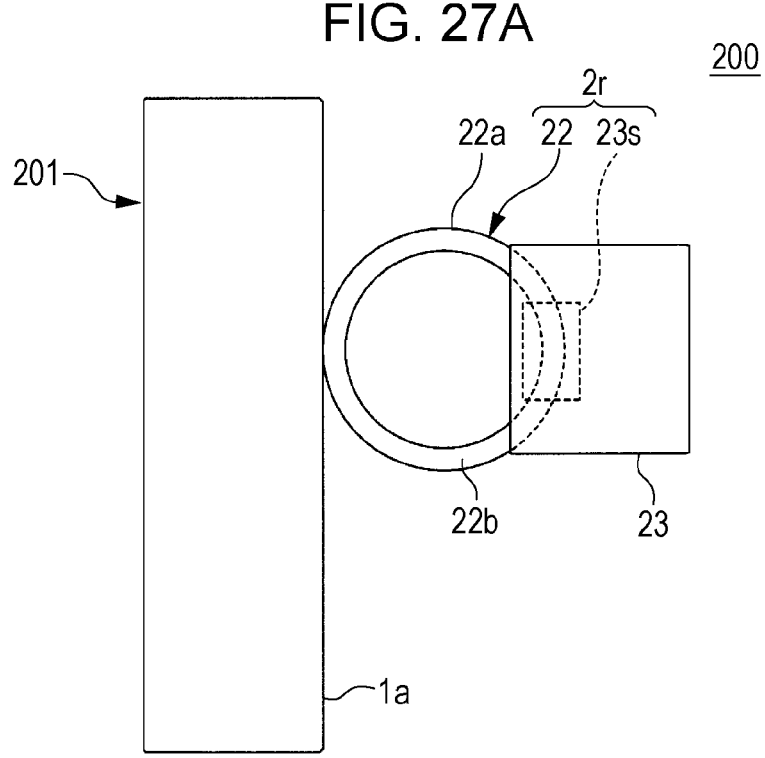
FIG. 27A is a left side view schematically illustrating an imaging apparatus in which a part of the rotational member is inserted into the imaging main body portion.

FIG. 27A is a plan view schematically illustrating an imaging apparatus 200 as one conformation of the imaging apparatus according to the present technology.

The imaging apparatus 200 includes a display main body portion 201, the rotational mechanism 2r, and the imaging main body portion 23.

The display main body portion 201 is a display main body portion in which the attaching portion 10 is omitted from the display apparatus 1. In the rotational member 22 of the rotational mechanism 2r of this case, the arc-like rail portion 22b is bonded to the front surface 1a of the display main body portion 201. In this case, the rotational center of the imaging main body portion 23 is on an external side of the display main body portion 201.

In the imaging apparatus 200 as described above, similar to the case of the imaging system 100, when viewed from the direction in which the rotational axis of the imaging main body portion 23 by the rotational mechanism 2r is viewed as a point, the imaging main body portion 23 is superposed on a circle which has the same center and the same radius as the arc of the arc-like portion 22a.

Accordingly, the interval between the imaging main body portion 23 and the display main body portion 201 is narrowed in the imaging state.

Accordingly, it is possible to make the imaging apparatus 200 in the imaging state compact, and it is possible to improve stability on gripping the imaging apparatus 200.

Figure 27B:
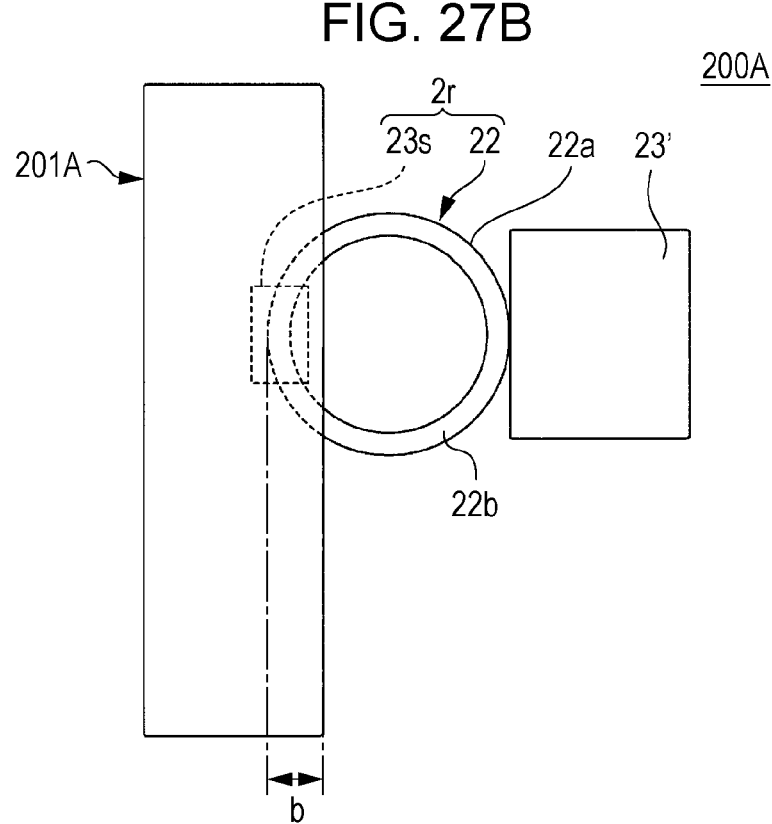
FIG. 27B is a left side view schematically illustrating the imaging apparatus in which a part of the rotational member is inserted into the display main body portion.

Furthermore, in the above description, a configuration in which a part of the arc-like rail portion 22b is slipped into the imaging main body portion 23 side is illustrated, but as the imaging apparatus 200A illustrated in FIG. 27B, a display main body portion 201A in which a part of the arc-like rail portion 22b is able to be inserted into the inner portion is disposed instead of the display main body portion 201, and thus it is possible to adopt a configuration in which a part of the arc-like rail portion 22b is slipped into the display main body portion 201A side.

In the imaging apparatus 200A as illustrated in the drawings, the sliding retaining unit 23s for slidably retaining the arc-like rail portion 22b is disposed in the display main body portion 201A, and according to this, the imaging main body portion 23' is disposed instead of the imaging main body portion 23, and the arc-like rail portion 22b is bonded to the back surface of the imaging main body portion 23'. In this case, the rotational center of the imaging main body portion 23' is on an external side of the display main body portion 201A.

In the imaging apparatus 200A as described above, when viewed from the direction in which the rotational axis of the imaging main body portion 23 by the rotational mechanism 2r is viewed as a point, the display main body portion 201A is superposed on a circle which has the same center and the same radius as the arc of the arc-like portion 22a instead of the imaging main body portion 23'.

Accordingly, the interval between the imaging main body portion 23' and the display main body portion 201A is narrowed in the imaging state.

Accordingly, it is possible to make the imaging apparatus 200A in the imaging state compact, and it is possible to improve stability on gripping the imaging apparatus 200A.

Furthermore, for confirmation, in the imaging apparatus 200A, a value of depth illustrated as "b" in the drawing, by which the arc-like rail portion 22b is slipped into the display main body portion 201A side corresponds to a value of the length "b" described in FIG. 23B.

In addition, in the above description, a case where the "rotational mechanism" of the present technology includes the "rotational member" in which the "arc-like rail portion" is formed is illustrated, but as the "rotational member" included in the "rotational mechanism", various rotational members are considered other than the rotational member in which the "arc-like rail portion" is formed.

Figure 28A:
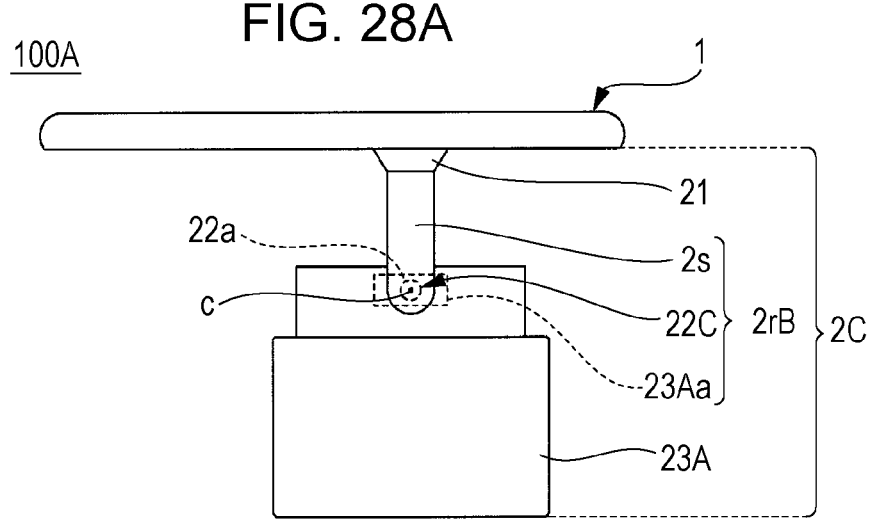
FIG. 28A is a plan view of an imaging system including a rotational mechanism as a modification example.
Figure 28B:
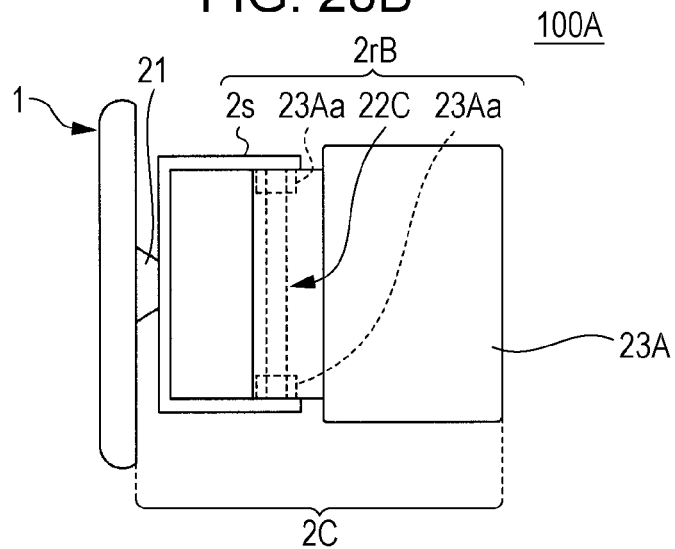
FIG. 28B is a left side view thereof.
Figure 28C:
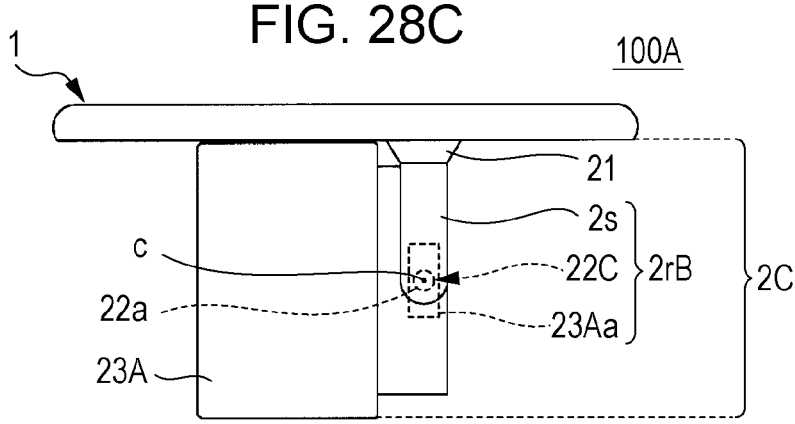
FIG. 28C is a plan view thereof.

FIGS. 28A to 28C are explanatory views with respect to an imaging unit 2C provided with a rotational mechanism 2rB which includes a rod-like axis member as a rotational member 22C. Furthermore, FIG. 28A, FIG. 28B, and FIG. 28C are a plan view, a left side view, and a plan view of an imaging system 100A including the imaging unit 2C and the display apparatus 1, respectively. In each drawing, the exchangeable lens 3 is not illustrated, FIG. 28A illustrates a state where a rotation angle of an imaging main body portion 23A is adjusted such that an imaging direction of an imaging element 23i included in the imaging main body portion 23A described later is the front direction, and FIG. 28C illustrates a state where the imaging main body portion 23A is folded in parallel with the display apparatus 1.

The imaging unit 2C includes an attached portion 21, the rotational member 22C, a rotational member support portion 2s which is bonded to the attached portion 21 and supports the rotational member 22C, and the imaging main body portion 23A.

The rotational member 22C has a circular cross-section, and an outer circumference thereof is the arc-like portion 22a over a circumference (refer to FIGS. 28A and 28C). The rotational member support portion 2s includes two leg portions which are disposed to face each other, and the two leg portions pinch the rotational member 22C in the vicinity of the tip end portion (refer to FIG. 28B). The rotational member 22C is fixed to the two leg portions.

The imaging main body portion 23A is different from the imaging main body portion 23 in that the rotational member 22 is not able to be inserted into the inner portion and the radius of a part of the back surface side is narrowed toward the center side. In the inner portion of a portion in which the radius of the back surface side of the imaging main body portion 23A is narrowed, the rotational member 22C is inserted, and retaining portions 23Aa and 23Aa which retain the inserted rotational member 22C to be rotatable around the center c of the arc of the arc-like portion 22a as the rotational center are disposed. The retaining portions 23Aa and 23Aa are supported from a housing side of the imaging main body portion 23A. The portion in which the radius of the back surface side of the imaging main body portion 23A is narrowed is between the two leg portions of the rotational member support portion 2s.

The rotational mechanism 2rB includes the rotational member support portion 2s, the rotational member 22C, and the retaining portions 23Aa and 23Aa.

By configuring the rotational mechanism 2rB as described above, the imaging main body portion 23A is able to be rotated around the center c of the arc of the arc-like portion 22a of the rotational member 22C as the rotational center in the direction in which the imaging direction of the imaging element 23i is changed.

Furthermore, in the imaging unit 2C, by narrowing the radius of a part of the back surface side of the imaging main body portion 23A, it is possible to prevent the imaging main body portion 23A from interfering with the attached portion 21 when the imaging main body portion 23A is folded in parallel with the display apparatus 1 (refer to FIG. 28C).

Here, in the imaging unit 2C, the rotational mechanism 2rB includes the rotational member 22C formed as the arc-like portion 22a in which at least a part of the outer circumference is bent into the shape of an arc. Further, the rotational mechanism 2rB connects the attached portion 21 and the imaging main body portion 23A such that the imaging main body portion 23A is able to be rotated around the center c of the arc of the arc-like portion 22a as the rotational center in the direction in which the imaging direction of the imaging element 23i is changed. Then, as understood with reference to FIGS. 28A and 28C, in the imaging unit 2C, when viewed from a direction in which the rotational axis of the imaging main body portion 23A by the rotational mechanism 2rB is viewed as a point, the imaging main body portion 23A is superposed on a circle which has the same center and the same radius as the arc of the arc-like portion 22a.

Accordingly, similar to the imaging unit 2, an interval between the imaging main body portion 23A and the display apparatus 1 in the imaging state is narrowed by the imaging unit 2C.

Accordingly, it is possible to make the imaging system 100A in the imaging state compact, and it is possible to improve stability on gripping the imaging system 100A.

Figure 29A:
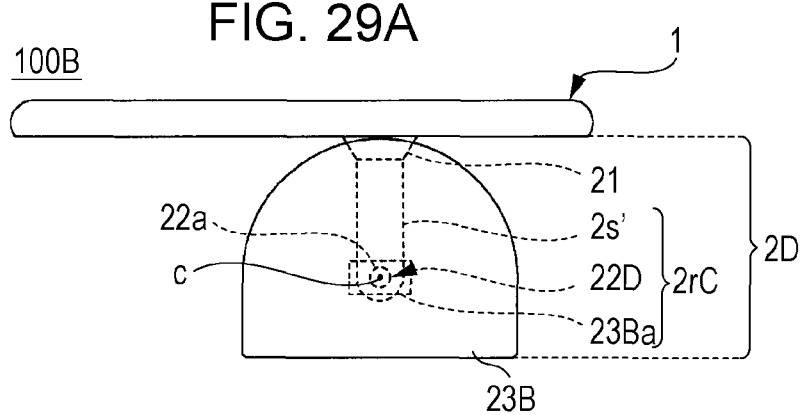
FIG. 29A is a plan view of an imaging system including a rotational mechanism as another modification example.
Figure 29B:
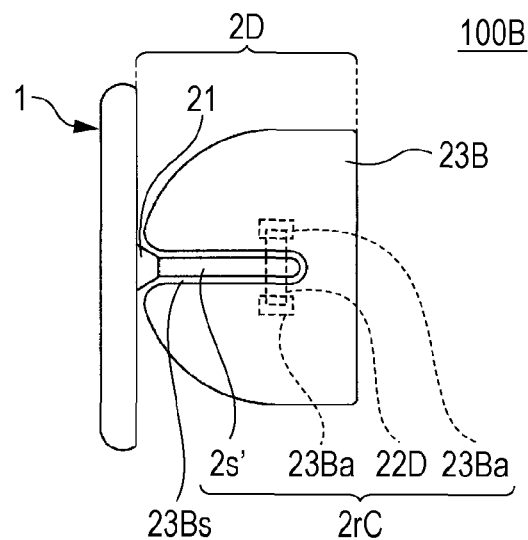
FIG. 29B is a left side view thereof.
Figure 29C:
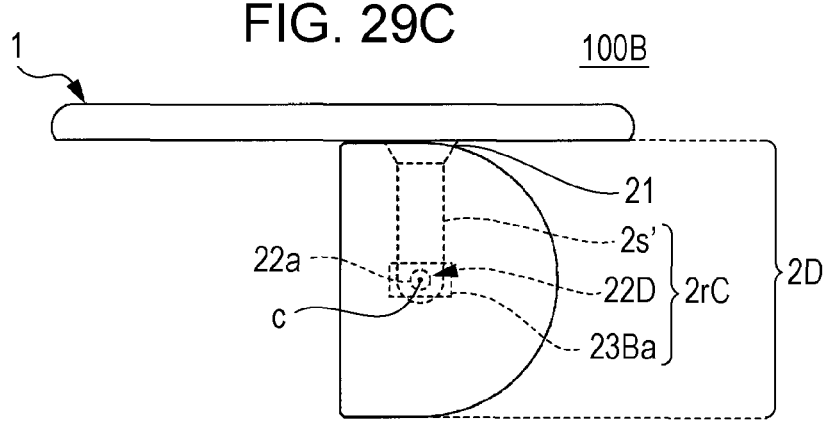
FIG. 29C is a plan view thereof.

FIGS. 29A to 29C are explanatory views with respect to another configuration example of the "rotational mechanism", and FIGS. 29A, 29B, and 29C are a plan view, a left side view, and a plan view of an imaging system 100B including an imaging unit 2D provided with a rotational mechanism 2rC, and the display apparatus 1, respectively. Furthermore, in each drawing of FIGS. 29A to 29C, the exchangeable lens 3 is not illustrated, FIG. 29A illustrates a state where a rotation angle of an imaging main body portion 23B is adjusted such that an image direction of an imaging element 23i of the imaging main body portion 23B is the front direction as described below, and FIG. 29C illustrates a state where the imaging main body portion 23B is folded in parallel with the display apparatus 1.

The imaging unit 2D includes an attached portion 21, a rotational member 22D, a rotational member support portion 2s' which is bonded to the attached portion 21 and supports the rotational member 22D, and the imaging main body portion 23B. The rotational member 22D is a rod-like member having a circular cross-section, and an outer circumference thereof is the arc-like portion 22a over a circumference (refer to FIGS. 29A and 29C). The rotational member support portion 2s' is a plate-like member and the rotational member 22D is inserted in the vicinity of an end portion on a side opposite to a side where the attached portion 21 is bonded. The rotational member 22D is fixed to the rotational member support portion 2s' in such an inserted state.

As illustrated in FIG. 29B, in the imaging main body portion 23B, a central portion in the up and down direction on the back surface is evenly recessed to the front surface side. According to the fact that the back surface of the imaging main body portion 23B is recessed in this manner, a void as a concave portion 23Bs is formed. The rotational member support portion 2s' is inserted into the concave portion 23Bs.

In the rotational member 22D, one end portion is inserted into a region above the concave portion 23Bs in the inner portion of the imaging main body portion 23B, and the other end portion is inserted into a region below the concave portion 23Bs in the inner portion of the imaging main body portion 23B. In the inner portion of the imaging main body portion 23B, a retaining portion 23Ba and a retaining portion 23Ba which retain the inserted one end portion and other end portion of the rotational member 22D are disposed. The retaining portions 23Ba and 23Ba retain the rotational member 22D to be rotatable around the center c of the arc-like portion 22a as the rotational center. The retaining portions 23Ba and 23Ba are supported from the housing side of the imaging main body portion 23B.

The rotational mechanism 2rC includes the rotational member support portion 2s', the rotational member 22D, and the retaining portions 23Ba and 23Ba.

According to the rotational mechanism 2rC as described above, the imaging main body portion 23B is able to be rotated around the center c of the arc of the arc-like portion 22a of the rotational member 22D as the rotational center in the direction in which the imaging direction of the imaging element 23i is changed.

In the imaging system 100B, the rotational mechanism 2rC includes the rotational member 22D formed as the arc-like portion 22a in which at least a part of the outer circumference is bent into the shape of an arc, and connects the attached portion 21 and the imaging main body portion 23A such that the imaging main body portion 23B is able to be rotated around the center c of the arc of the arc-like portion 22a as the rotational center in the direction in which the imaging direction of the imaging element 23i is changed. Then, as understood with reference to FIGS. 29A and 29C, in the imaging unit 2D, when viewed from the direction in which the rotational axis c of the imaging main body portion 23B by the rotational mechanism 2rD is viewed as a point, the imaging main body portion 23B is superposed on a circle which has the same center and the same radius as the arc of the arc-like portion 22a.

Accordingly, the interval between the imaging main body portion 23B and the display apparatus 1 in the imaging state is narrowed by the imaging unit 2D.

Accordingly, it is possible to make the imaging system 100B in the imaging state compact, and it is possible to improve stability on gripping the imaging system 100B.

Here, in the imaging unit 2D, a part of the back surface side of the imaging main body portion 23B is formed such that the radius is gradually narrowed toward the back surface side (refer to FIGS. 29A to 29C). Accordingly, the interval between the imaging main body portion 23B and the display apparatus 1 is able to be further narrowed.

Furthermore, in the above description, a configuration in which the exchangeable lens 3 is attachable and detachable with respect to the imaging main body portion 23 (or the imaging main body portion 23', 23A, or 23B) is illustrated, but the "imaging main body portion" of the present technology may be integrally formed with a lens barrel portion including a lens. The same also applies to the imaging apparatus 200 (or the imaging apparatus 200A).

In addition, in the above description, a configuration in which the imaging main body portion 23 (or the imaging main body portion 23', 23A, or 23B) is continuously rotated by the rotational mechanism 2r (or the rotational mechanism 2rA or 2rB) is illustrated, but a configuration in which the "imaging main body portion" of the present technology is rotated by each of predetermined angles in a stepwise fashion may be adopted. In addition, a configuration in which a click feeling is provided to the user according to the rotation may be adopted.

In addition, in the present technology, as the "rotational mechanism", a mechanism for locking the rotation of the "imaging main body portion" may be added, and may be configured to be switchable between a locking state and a locking release state of the rotation of the "imaging main body portion" according to a manipulation.

In addition, as the "imaging unit" described above, at least any one of the following configurations may be further included. That is, at least any one of a battery for supplying a power-supply voltage to the circuit unit, a shutter button for instructing an imaging timing, a memory card slot for detachably attaching a memory card for storing a captured image, an external terminal for communicating with an external instrument, and a display screen for displaying a remaining amount of the battery life or the like may be further included.

In addition, the exchangeable lens 3 may be any one of a single focal lens and a zoom lens. In the exchangeable lens 3 as the zoom lens, a zoom ring or a zoom button (when the zoom lens is electrically driven) may be formed. In addition, regardless of type of the single focal lens and the zoom lens, a focus ring for performing a focus manipulation may be formed in the exchangeable lens 3. Furthermore, the same also applies to a case of adopting the configuration in which the "imaging main body portion" is integrally formed with the lens barrel portion including the lens as described above.

Furthermore, the effects disclosed herein are merely exemplifications and are not limited. In addition, additional effects may be obtained.

7. The Present Technology

Furthermore, the present technology may adopt the following configurations.

(1) An imaging unit, including: an attached portion which is detachably attached to an attaching portion disposed in a display apparatus including a display screen; an imaging main body portion which includes an imaging element; and a rotational mechanism which includes a rotational member formed as an arc-like portion in which at least a part of an outer circumference is bent into the shape of an arc, and connects the attached portion and the imaging main body portion such that the imaging main body portion is able to be rotated around a center of an arc of the arc-like portion as a rotational center in a direction in which an imaging direction of the imaging element is changed, in which when viewed from a direction in which a rotational axis of the imaging main body portion by the rotational mechanism is viewed as a point, the imaging main body portion is superposed on a circle which has the same center and the same radius as the arc of the arc-like portion.

(2) The imaging unit according to (1), in which the attached portion is configured to be attachable with respect to the attaching portion at different attachment angles.

(3) The imaging unit according to (1) or (2), in which the rotational mechanism includes a member formed as an arc-like rail portion in which at least a part is bent into the shape of an arc as the rotational member, and includes sliding retaining units for slidably retaining the arc-like rail portion.

(4) The imaging unit according to (3), in which the rotational member is supported from the attached portion side, and the sliding retaining unit is disposed in the imaging main body portion.

(5) The imaging unit according to (3) or (4), in which a surface of the imaging main body portion on a side in which the imaging main body portion faces the rotational member is bent into the shape of a mortar, and mirror-like finishing is performed with respect to the bent portion.

(6) The imaging unit according to (3) or (5), in which the rotational member is supported from the imaging main body portion side, and the sliding retaining unit is disposed in the attached portion.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging unit, comprising:
   an attached portion which is detachably attached to an attaching portion disposed in a display apparatus including a display screen;
   an imaging main body portion which includes an imaging element; and
   a rotational mechanism which includes a rotational member formed as an arc-like portion in which at least a part of an outer circumference is bent into the shape of an arc, and connects the attached portion and the imaging main body portion such that the imaging main body portion is able to be rotated around a center of an arc of the arc-like portion as a rotational center in a direction in which an imaging direction of the imaging element is changed,
   wherein when viewed from a direction in which a rotational axis of the imaging main body portion by the rotational mechanism is viewed as a point, the imaging main body portion is superposed on a circle which has the same center and the same radius as the arc of the arc-like portion.

2. The imaging unit according to claim 1,
   wherein the attached portion is configured to be attachable with respect to the attaching portion at different attachment angles.

3. The imaging unit according to claim 1,
   wherein the rotational mechanism includes a member formed as an arc-like rail portion in which at least a part is bent into the shape of an arc as the rotational member, and includes sliding retaining units for slidably retaining the arc-like rail portion.

4. The imaging unit according to claim 3,
   wherein the rotational member is supported from the attached portion side, and
   the sliding retaining unit is disposed in the imaging main body portion.

5. The imaging unit according to claim 3,
   wherein a surface of the imaging main body portion on a side in which the imaging main body portion faces the rotational member is bent into the shape of a mortar, and mirror-like finishing is performed with respect to the bent portion.

6. The imaging unit according to claim 3,
   wherein the rotational member is supported from the imaging main body portion side, and the sliding retaining unit is disposed in the attached portion.

7. An imaging apparatus, comprising:

a display main body portion which includes a display screen;

an imaging main body portion which includes an imaging element; and a rotational mechanism which includes a rotational member formed as an arc-like portion in which at least a part of an outer circumference is bent into the shape of an arc, and connects the display main body portion and the imaging main body portion such that the imaging main body portion is able to be rotated around a center of an arc of the arc-like portion as a rotational center in a direction in which an imaging direction of the imaging element is changed, wherein the rotational center is on an external side of the display main body portion, and when viewed from a direction in which a rotational axis of the imaging main body portion by the rotational mechanism is viewed as a point, at least any one of the imaging main body portion and the display main body portion is superposed on a circle which has the same center and the same radius as the arc of the arc-like portion.

8. The imaging apparatus according to claim 7, wherein the rotational mechanism includes a member formed as an arc-like rail portion in which at least a part is bent into the shape of an arc as the rotational member, and includes sliding retaining units for slidably retaining the arc-like rail portion.

9. The imaging apparatus according to claim 8, wherein the rotational member is supported from the display main body portion side, and the sliding retaining unit is disposed in the imaging main body portion.

10. The imaging apparatus according to claim 8, wherein a surface of the imaging main body portion on a side in which the imaging main body portion faces the rotational member is bent into the shape of a mortar, and mirror-like finishing is performed with respect to the bent portion.

\* \* \* \* \*